(12) United States Patent
Cao et al.

(10) Patent No.: US 11,956,691 B2
(45) Date of Patent: Apr. 9, 2024

(54) COMMUNICATION METHOD, DEVICE, AND SYSTEM

(71) Applicant: HUAWEI TECHNOLOGIES CO., LTD., Guangdong (CN)

(72) Inventors: Longyu Cao, Shanghai (CN); Yaoguang Wang, Shanghai (CN); Yijun Yu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 405 days.

(21) Appl. No.: 17/490,447

(22) Filed: Sep. 30, 2021

(65) Prior Publication Data
US 2022/0022122 A1    Jan. 20, 2022

Related U.S. Application Data

(63) Continuation of application No. PCT/CN2020/080963, filed on Mar. 24, 2020.

(30) Foreign Application Priority Data

Mar. 30, 2019   (CN) .......................... 201910254004.5

(51) Int. Cl.
*H04W 40/36* (2009.01)
*H04W 36/00* (2009.01)
(Continued)

(52) U.S. Cl.
CPC ....... *H04W 36/32* (2013.01); *H04W 36/0061* (2013.01); *H04W 36/00835* (2018.08); *H04W 40/36* (2013.01); *H04W 60/04* (2013.01)

(58) Field of Classification Search
None
See application file for complete search history.

(56) References Cited

U.S. PATENT DOCUMENTS

2017/0208518 A1\* 7/2017 Shu ..................... H04W 36/125
2018/0368000 A1  12/2018 Ahmavaara et al.
(Continued)

FOREIGN PATENT DOCUMENTS

| CN | 101505510 A | 8/2009 |
|---|---|---|
| CN | 101656990 A | 2/2010 |

(Continued)

OTHER PUBLICATIONS

Huawei, Nokia Siemens Networks, Alcatel-Lucent, "Multi-PLMN MDT," 3GPP TSG-RAN WG3 Meeting #78, R3-122900, New Orleans, US, Nov. 12-16, 2012, 60 pages.

(Continued)

*Primary Examiner* — The Hy Nguyen
(74) *Attorney, Agent, or Firm* — Fish & Richardson P.C.

(57) ABSTRACT

One example method includes receiving, by a first mobility management network element, a first cell identifier and a network identifier from a first network element, where the network identifier includes an identifier of a first private network and an identifier of a second private network. The first mobility management network element can then obtain information about a second network element based on the first cell identifier and the network identifier, where the first network element serves a terminal device in the first private network, and where the second network element serves the terminal device in the second private network. The first mobility management network element can then send the first cell identifier and the network identifier to the second network element indicated by the information about the second network element, where the first cell identifier and the network identifier are used to obtain downlink routing information.

18 Claims, 25 Drawing Sheets

(51) Int. Cl.
    *H04W 36/32* (2009.01)
    *H04W 60/04* (2009.01)

(56) References Cited

U.S. PATENT DOCUMENTS

2020/0205205 A1* 6/2020 Ha .................. H04W 48/16
2021/0112486 A1* 4/2021 Ke .................. H04W 48/20

FOREIGN PATENT DOCUMENTS

| CN | 102143536 A | 8/2011 |
| CN | 102984773 A | 3/2013 |
| CN | 107454641 A | 12/2017 |

OTHER PUBLICATIONS

3GPP TR 23.734 V16.1.0 (Mar. 2019), "3rd Generation Partnership Project; Technical Specification Group Services and System Aspects; Study on enhancement of 5G System (5GS) for vertical and Local Area Network (LAN) services (Release 16)," Mar. 2019, 111 pages.

Office Action issued in Chinese Application No. 201910254004.5 dated Mar. 1, 2021, 7 pages.

PCT International Search Report and Written Opinion issued in International Application No. PCT/CN2020/080963 dated Jun. 9, 2020, 17 pages (with English translation).

3GPP TS 23.502 V16.0.0 (Mar. 2019), "3rd Generation Partnership Project; Technical Specification Group Services and System Aspects; Procedures for the 5G System; Stage 2(Release 16)," Mar. 2019, 420 pages.

Extended European Search Report issued in European Application No. 20782702.3 dated Mar. 10, 2022, 10 pages.

Huawei, HiSilicon, "Solution for seamless service continuity between the PLMN and NPN for single radio UE-N31WF," 3GPP TSG-SA WG2 Meeting #129bis, S2-1812243, West Palm Beach, Florida, USA, Nov. 26-30, 2018, 4 pages.

* cited by examiner

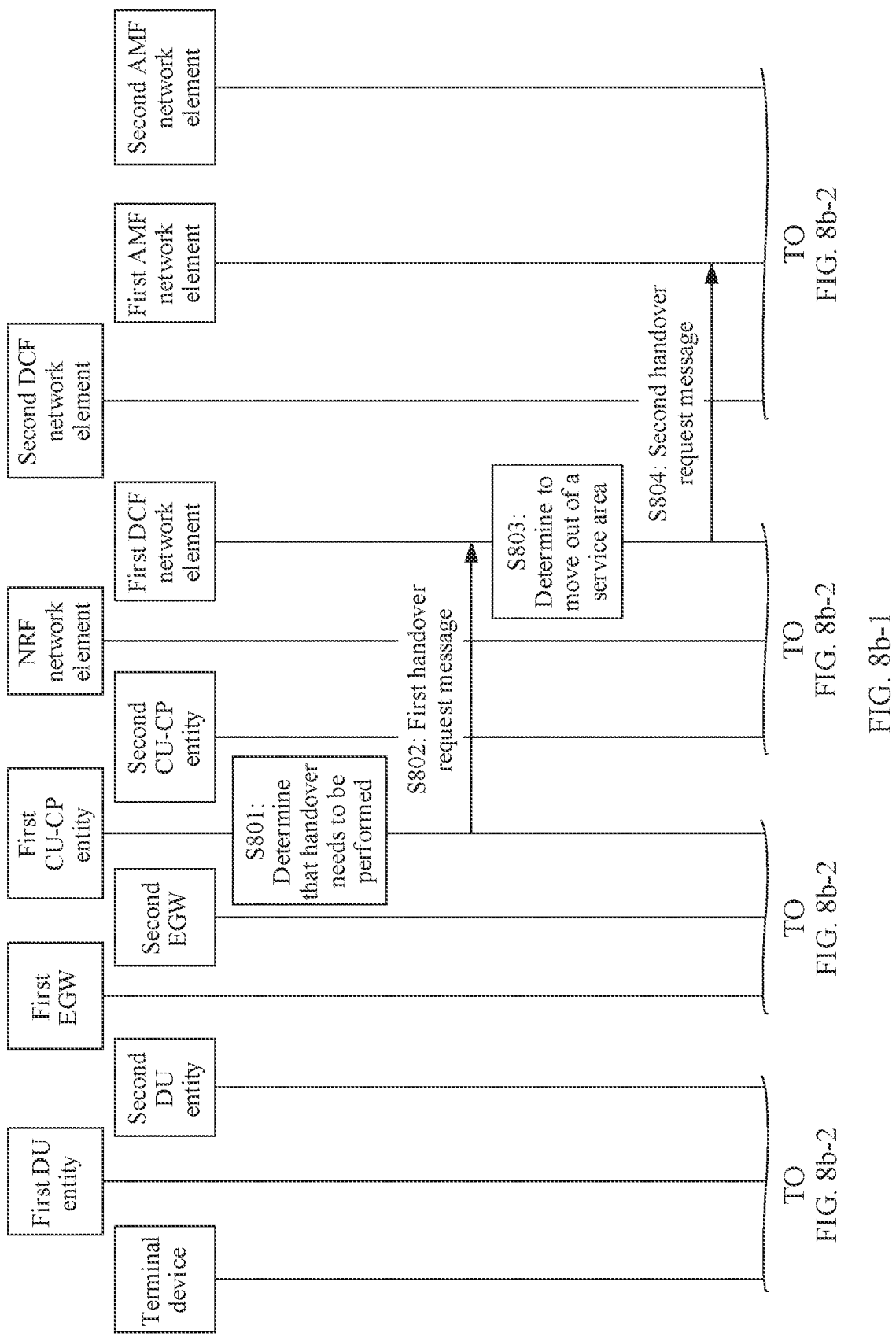

FIG. 8b-2

| CONT. FROM FIG. 8b-1 | CONT. FROM FIG. 8b-1 | CONT. FROM FIG. 8b-1 | CONT. FROM FIG. 8b-1 |

Manner 1

S805a: Determine that a first cell identifier belongs to a first TA list

S806a: First network service query request message

S807a: First network service query response message

TO FIG. 8b-3

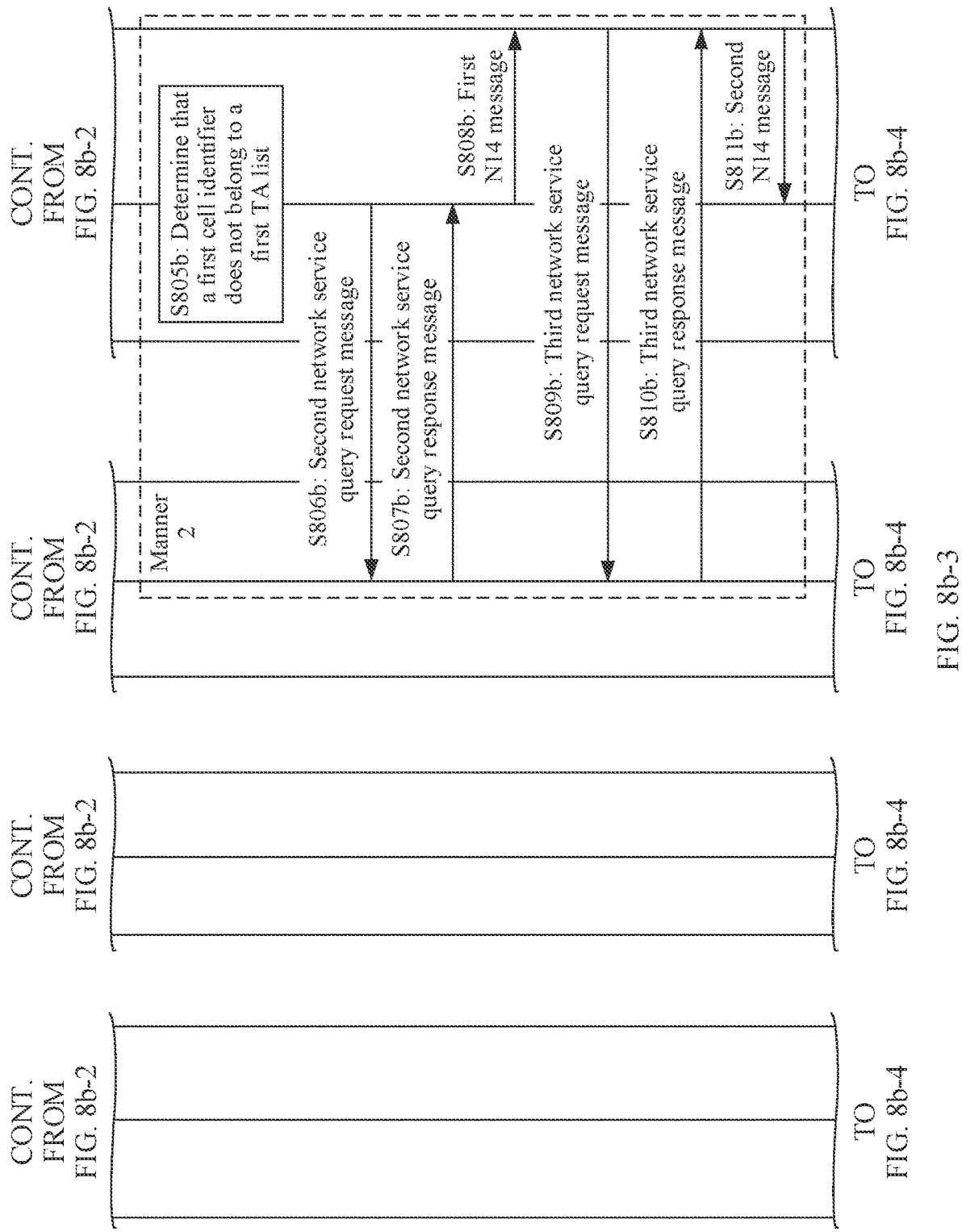

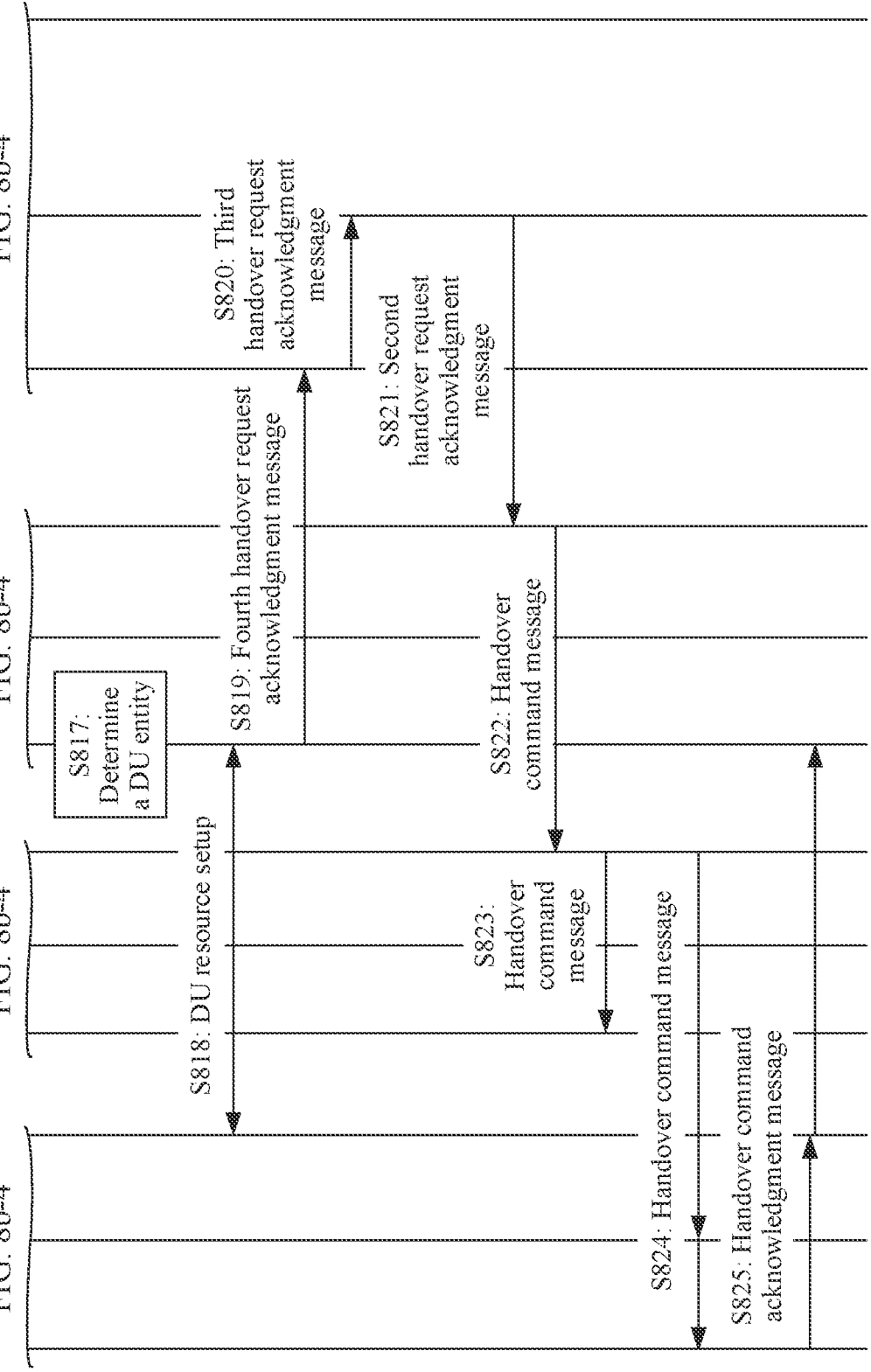

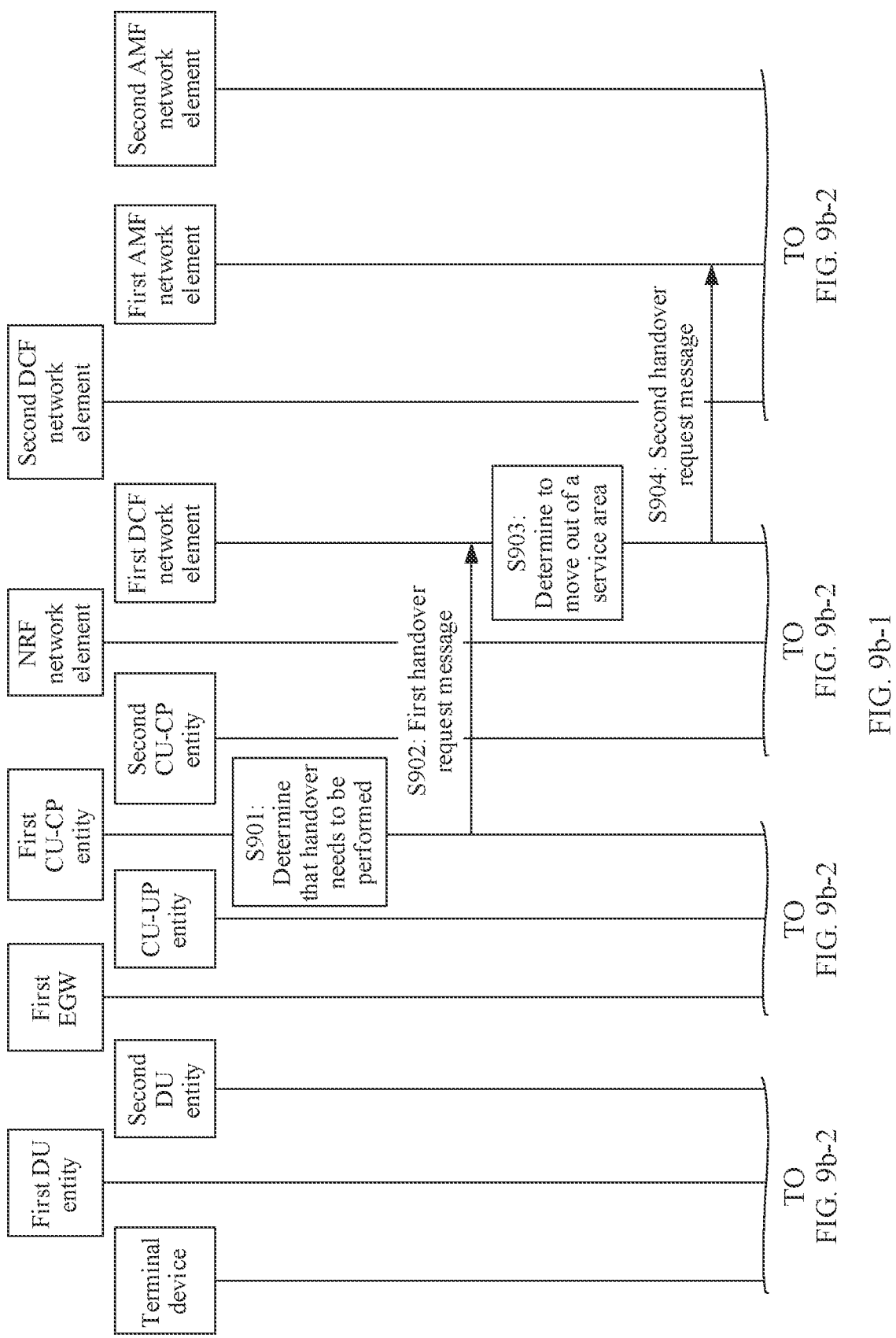

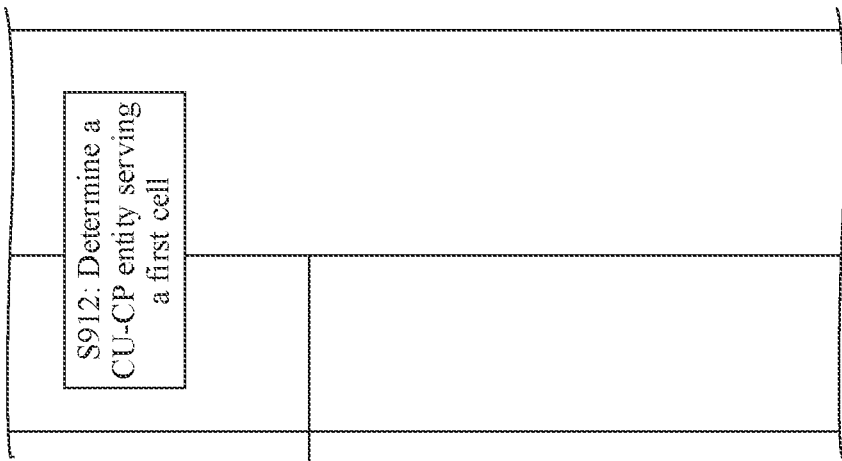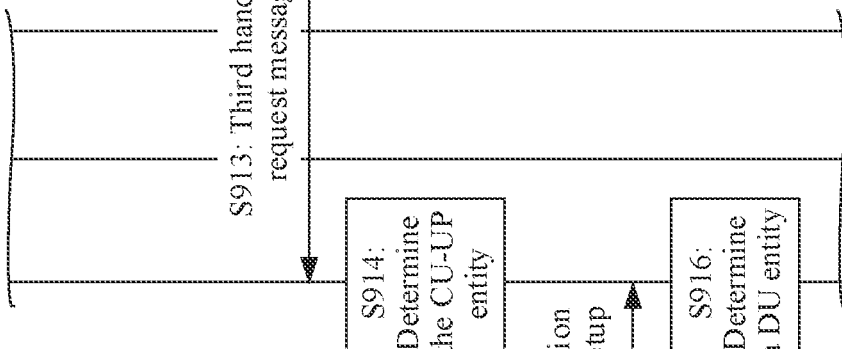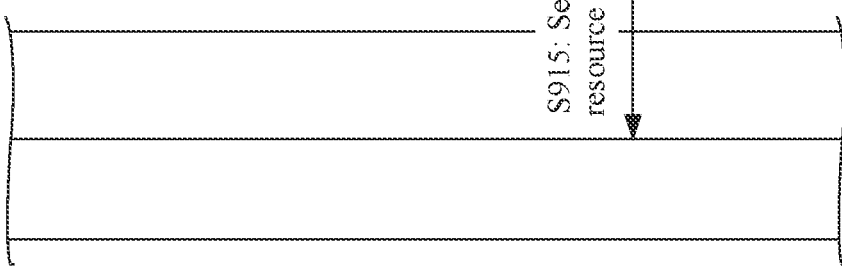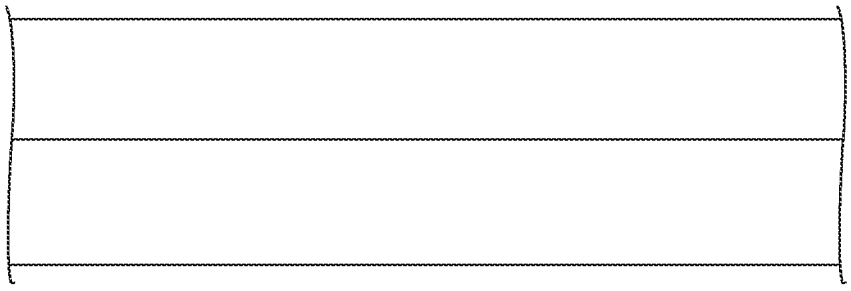
FIG. 9b-4

COMMUNICATION METHOD, DEVICE, AND SYSTEM

CROSS-REFERENCE TO RELATED APPLICATIONS

This application is a continuation of International Application No. PCT/CN2020/080963, filed on Mar. 24, 2020, which claims priority to Chinese Patent Application No. 201910254004.5, filed on Mar. 30, 2019. The disclosures of the aforementioned applications are hereby incorporated by reference in their entireties.

TECHNICAL FIELD

This application relates to the field of communication technologies, and in particular, to a communication method, device, and system.

BACKGROUND

To meet diversified scenario requirements of a private network in the vertical industry, the 3rd generation partnership project (3GPP) standards organization defines two types of private network modes: type A mode and type B mode. In the type B mode, a private network in the vertical industry is independent, and the private network has no interaction requirement with a public land mobile network (PLMN). However, a private network in the type A mode has an interworking requirement with the PLMN. For example, as shown in FIG. 1, both a factory A and a factory B are located in coverage of the private network in the type A mode. When an enterprise user leaves the factory A and goes to the factory B the PLMN needs to ensure provision of a network service to ensure service continuity. Therefore, the private network in the type A mode has the interworking requirement with the PLMN.

However, as shown in FIG. 2, network coverage of the PLMN usually overlaps network coverage of the private network in the type A mode. In this case, a terminal device may be located in an overlapping coverage area of the private network in the type A mode and the PLMN. If the terminal device leaves a coverage area of the private network in the type A mode, how to hand over the terminal device to a target cell and ensure service continuity is a problem that needs to be urgently resolved currently.

SUMMARY

Embodiments of this application provide a communication method, device, and system, so that after a terminal device moves out of coverage of a first private network, the terminal device can be handed over to a target cell, and service continuity can be ensured.

To achieve the foregoing objective, the following technical solutions are used in some embodiments of this application.

According to a first aspect, a communication method is provided. The method includes: A first mobility management network element receives a first cell identifier and a network identifier from a first network element, where the network identifier includes an identifier of a first private network and an identifier of a second private network; the first mobility management network element obtains information about a second network element based on the first cell identifier and the network identifier, where the first network element serves a terminal device in the first private network, and the second network element serves the terminal device in the second private network; and the first mobility management network element sends the first cell identifier and the network identifier to the second network element indicated by the information about the second network element, where the first cell identifier and the network identifier are used to obtain downlink routing information, and the downlink routing information is used to indicate transmission of downlink data from a first user plane entity in the first private network to a second user plane entity in the second private network.

Based on this solution, in this solution, after moving out of coverage of the first private network, the terminal device may select the second private network, and the first cell identifier and the network identifier that are sent by the first mobility management network element to the second network element in the second private network may be used to obtain the downlink routing information, where the downlink routing information is used to indicate the transmission of the downlink data from the first user plane entity in the first private network to the second user plane entity in the second private network. In this way, when receiving the downlink data, the first user plane entity may send the downlink data to the second user plane entity based on the downlink data routing information, so as to maintain service continuity.

In a possible design, that the first mobility management network element obtains information about a second network element based on the first cell identifier and the network identifier includes: The first mobility management network element determines that the first cell identifier belongs to a first tracking area TA list allocated by the first mobility management network element to the terminal device; the first mobility management network element sends the first cell identifier and the network identifier to a network repository function network element, where the first cell identifier and the network identifier are used to determine the information about the second network element; and the first mobility management network element receives the information about the second network element from the network repository function network element. That is, in this embodiment of this application, the first mobility management network element may obtain the information about the second network element from the network repository function network element.

In a possible design, the communication method further includes: The first mobility management network element receives a second cell identifier from the terminal device; the first mobility management network element allocates the first TA list to the terminal device, where the first TA list includes the second cell identifier and the first cell identifier; and the first mobility management network element sends the first TA list to the terminal device by using the first network element, where the first TA list is used to identify a location area in which the terminal device registers. Based on this solution, the terminal device may learn of the location area in which the terminal device registers.

In a possible design, that the first mobility management network element obtains information about a second network element based on the first cell identifier and the network identifier includes: The first mobility management network element determines that the first cell identifier does not belong to a first TA list allocated by the first mobility management network element to the terminal device; the first mobility management network element sends the first cell identifier to a network repository function network element; the first mobility management network element receives information about a second mobility management network element from the network repository function network element, where the second mobility management network element is a mobility management network element that can serve a cell corresponding to the first cell identifier; the first mobility management network element sends the first cell identifier and the network identifier to the second mobility management network element indicated by the second mobility management network element, where the first cell identifier and the network identifier are used to determine the information about the second network element; and the first mobility management network element receives the information about the second network element from the second mobility management network element. In other words, in this embodiment of this application, the first cell identifier may not be allocated by the first mobility management network element. In this case, the first mobility management network element needs to obtain the information about the second network element from the network repository function network element by using the second mobility management network element.

In a possible design, the communication method further includes: The first mobility management network element receives a second cell identifier from the terminal device; the first mobility management network element allocates the first TA list to the terminal device, where the first TA list includes the second cell identifier; and the first mobility management network element sends the first TA list to the terminal device by using the first network element, where the first TA list is used to identify a location area in which the terminal device registers. Based on this solution, the terminal device can directly access a network from a private network, and complete two-level hierarchical registration of the first network element and the first mobility management network element.

In a possible design, the communication method further includes: The first mobility management network element receives the downlink routing information from the second network element, where the downlink routing information is allocated by the second user plane entity; and the first mobility management network element sends the downlink routing information to the first user plane entity by using the first network element. In other words, in this solution, after the terminal device moves out of coverage of the first private network and selects the second private network, the second user plane entity in the second private network allocates the downlink routing information, and sends the downlink routing information to the first user plane entity in the first private network.

In a possible design, the communication method further includes: The first mobility management network element receives the second cell identifier from the terminal device; the first mobility management network element receives the network identifier from a unified data management network element; the first mobility management network element determines, based on the second cell identifier and the network identifier, that a private network that can be accessed by the terminal device is deployed in a cell identified by the second cell identifier; and the first mobility management network element sends registration rejection information to the terminal device, where the registration rejection information is used to indicate the terminal device to register with the private network that can be accessed by the terminal device. Based on this solution, when the terminal device is located in an overlapping coverage area of a public network and the private network that can be accessed by the terminal device, the terminal device selects the public network to camp on, and initiates registration of the terminal device with the public network. After the terminal device receives the registration rejection information, the terminal device may register with the private network that can be accessed by the terminal device.

According to a second aspect, a communication method is provided. The method includes: A first network element obtains a first cell identifier and a network identifier, where the network identifier includes an identifier of a first private network and an identifier of a second private network, and the first network element serves a terminal device in the first private network; the first network element determines, based on the first cell identifier, that an area in which the terminal device is currently located is beyond a service range of a cell identified by the first cell identifier; and the first network element sends the first cell identifier and the network identifier to a first mobility management network element, where the first cell identifier and the network identifier are used to obtain downlink routing information, and the downlink routing information is used to indicate transmission of downlink data from a first user plane entity in the first private network to a second user plane entity in the second private network. Based on this solution, in this solution, after moving out of coverage of the first private network, the terminal device may select the second private network, and the first cell identifier and the network identifier that are sent by the first network element to the first mobility management network element may be used to obtain the downlink routing information, where the downlink routing information is used to indicate the transmission of the downlink data from the first user plane entity in the first private network to the second user plane entity in the second private network. In this way, when receiving the downlink data, the first user plane entity may send the downlink data to the second user plane entity based on the downlink data routing information, so as to maintain service continuity.

In a possible design, the communication method further includes: The first network element receives the downlink routing information from the first mobility management network element, where the downlink routing information is allocated by the second user plane entity; and the first network element sends the downlink routing information to the first user plane entity. In other words, in this solution, after the terminal device moves out of coverage of the first private network and selects the second private network, the second user plane entity in the second private network allocates the downlink routing information, and sends the downlink routing information to the first user plane entity in the first private network.

In a possible design, the communication method further includes: The first network element receives a second cell identifier from the terminal device; the first network element sends the second cell identifier to the first mobility management network element; the first network element receives, from the first mobility management network element, a first tracking area TA list allocated by the first mobility management network element to the terminal device, where the first TA list includes the second cell identifier and the first cell identifier, or the first TA list includes the second cell identifier; and the first network element sends the first TA list to the terminal device, where the first TA list is used to identify a location area in which the terminal device registers. Based on this solution, the terminal device may register with a private network that can be accessed by the terminal device.

In a possible design, the communication method further includes:

The first network element sends, to a network repository function network element, an identifier of the first network element, a cell identifier of a serving cell of the first network element, and a network identifier of a network in which the first network element is located, to register with the network repository function network element. Based on this solution, registration of network attribute information of the first network element may be implemented, so that in a subsequent service processing process, another network functional entity can accurately obtain the attribute information of the first network element, thereby ensuring normal running of a service.

According to a third aspect, a communication method is provided. The method includes: A first mobility management network element receives a first cell identifier and a network identifier from a first network element, where the network identifier includes an identifier of a first private network, and the first network element serves a terminal device in the first private network; the first mobility management network element determines, based on the first cell identifier and the network identifier, that a second mobility management network element currently serves the terminal device in a public network; the first mobility management network element determines a centralized unit-control plane entity that serves the terminal device and that is in the public network; and the first mobility management network element sends the first cell identifier and the network identifier to the centralized unit-control plane entity in the public network, where the first cell identifier and the network identifier are used to obtain downlink routing information, and the downlink routing information is used to indicate transmission of downlink data from a first user plane entity in the first private network to a second user plane entity in the public network. In this solution, after moving out of coverage of the first private network, the terminal device may select the public network, and the first mobility management network element in the public network may send the first cell identifier and the network identifier to the centralized unit-control plane entity in the public network, where the first cell identifier and the network identifier are used to obtain the downlink routing information, and the downlink routing information is used to indicate the transmission of the downlink data from the first user plane entity in the first private network to the second user plane entity in the public network. In this way, when receiving the downlink data, the first user plane entity may send the downlink data to the second user plane entity based on the downlink data routing information, so as to maintain service continuity.

According to a fourth aspect, a communication method is provided. The method includes: A first network element obtains a first cell identifier and a network identifier, where the network identifier includes an identifier of a first private network, and the first network element serves a terminal device in the first private network; the first network element determines, based on the first cell identifier, that an area in which the terminal device is currently located is beyond a service range of a cell identified by the first cell identifier; and the first network element sends the first cell identifier and the network identifier to a first mobility management network element, where the first cell identifier and the network identifier are used to obtain downlink routing information, and the downlink routing information is used to indicate transmission of downlink data from a first user plane entity in the first private network to a second user plane entity in a public network. In this solution, after moving out of coverage of the first private network, the terminal device may select the public network, and the first network element in the first private network may send the first cell identifier and the network identifier to the first mobility management network element, where the first cell identifier and the network identifier are used to obtain downlink routing information, and the downlink routing information is used to indicate the transmission of the downlink data from the first user plane entity in the first private network to the second user plane entity in the public network. In this way, when receiving the downlink data, the first user plane entity may send the downlink data to the second user plane entity based on the downlink data routing information, so as to maintain service continuity.

According to a fifth aspect, a communication method is provided. The communication method includes: A first network element determines a terminal identifier of a terminal device, a paging cell, and a centralized unit-control plane entity corresponding to the paging cell; and the first network element sends a paging message to the centralized unit-control plane entity corresponding to the paging cell, where the paging message includes the terminal identifier and information about the paging cell. Based on this solution, the first network element may implement paging processing on a terminal device in an idle state.

In a possible design, that a first network element determines a terminal identifier of a terminal device, a paging cell, and a centralized unit-control plane entity corresponding to the paging cell includes: The first network element receives an event report from the first user plane network element, where the event report includes terminal device internet protocol IP address information of a data packet header; and the first network element determines, based on the terminal device IP address information of the data packet header, the terminal identifier of the terminal device, the paging cell, and the centralized unit-control plane entity corresponding to the paging cell. In other words, the paging method provided in this embodiment of this application may be triggered by using data.

In a possible design, that a first network element determines a terminal identifier of a terminal device, a paging cell, and a centralized unit-control plane entity corresponding to the paging cell includes: The first network element receives a signaling processing request message for a terminal device in an idle state; and the first network element determines, based on the signaling processing request message, the terminal identifier of the terminal device, the paging cell, and the centralized unit-control plane entity corresponding to the paging cell. In other words, the paging method provided in this embodiment of this application may be triggered by using signaling.

In a possible design, the method further includes: If the first network element does not receive a service request of the terminal device for a plurality of times of paging or within preset time, the first network element sends a paging optimization request to the first mobility management network element, where the paging optimization request is used by the first mobility management network element to expand a paging range. Based on this solution, the first mobility management network element may perform paging processing in a larger range on the terminal device.

According to a sixth aspect, a communication device is provided, to implement the foregoing methods. The communication device may be the first mobility management network element in the first aspect or the third aspect, or an apparatus including the first mobility management network element. Alternatively, the communication device may be the first network element in the second aspect, the fourth aspect, or the fifth aspect, or an apparatus including the first network element. The communication device includes a corresponding module, unit, or means for implementing the foregoing methods. The module, unit, or means may be implemented by hardware or software, or implemented by hardware executing corresponding software. The hardware or the software includes one or more modules or units corresponding to the foregoing functions.

According to a seventh aspect, a communication device is provided, and includes a processor and a memory. The memory is configured to store computer instructions; and when the processor executes the instructions, the communication device is enabled to perform the communication method according to the first aspect. The communication device may be the first mobility management network element in the first aspect or the third aspect, or an apparatus including the first mobility management network element. Alternatively, the communication device may be the first network element in the second aspect, the fourth aspect, or the fifth aspect, or an apparatus including the first network element.

According to an eighth aspect, a communication device is provided, and includes a processor. The processor is configured to: after being coupled to a memory and reading instructions in the memory, perform, according to the instructions, the communication method according to any one of the first aspect to the fifth aspect. The communication device may be the first mobility management network element in the first aspect or the third aspect, or an apparatus including the first mobility management network element. Alternatively, the communication device may be the first network element in the second aspect, the fourth aspect, or the fifth aspect, or an apparatus including the first network element.

According to a ninth aspect, a computer-readable storage medium is provided. The computer-readable storage medium stores instructions; and when the instructions are run on a computer, the computer is enabled to perform the communication method according to any one of the first aspect to the fifth aspect.

According to a tenth aspect, a computer program product including instructions is provided. When the computer program product runs on a computer, the computer is enabled to perform the communication method according to any one of the first aspect to the fifth aspect.

According to an eleventh aspect, a communication device is provided (for example, the communication device may be a chip or a chip system). The communication device includes a processor, configured to implement the functions in any one of the first aspect to the fifth aspect. In a possible design, the communication device further includes a memory. The memory is configured to store necessary program instructions and necessary data. When the communication device is a chip system, the communication device may include a chip, or may include a chip and another discrete component.

For technical effects brought by any design manner in the sixth aspect to the eleventh aspect, refer to technical effects brought by different design manners in the first aspect, the second aspect, the third aspect, the fourth aspect, or the fifth aspect. Details are not described herein again.

According to a twelfth aspect, a communication system is provided. The communication system includes a first mobility management network element and a first network element. The first network element is configured to obtain a first cell identifier and a network identifier, where the network identifier includes an identifier of a first private network and an identifier of a second private network, and the first network element serves a terminal device in the first private network. The first network element is further configured to determine, based on the first cell identifier, that an area in which the terminal device is currently located is beyond a service range of a cell identified by the first cell identifier. The first network element is further configured to send the first cell identifier and the network identifier to the first mobility management network element. The first mobility management network element is configured to receive the first cell identifier and the network identifier from the first network element. The first mobility management network element is further configured to obtain information about a second network element based on the first cell identifier and the network identifier, where the second network element serves the terminal device in the second private network. The first mobility management network element is further configured to send the first cell identifier and the network identifier to the second network element indicated by the information about the second network element, where the first cell identifier and the network identifier are used to obtain downlink routing information, and the downlink routing information is used to indicate transmission of downlink data from a first user plane entity in the first private network to a second user plane entity in the second private network. Based on this solution, in this solution, after moving out of coverage of the first private network, the terminal device may select the second private network, and the first cell identifier and the network identifier that are sent by the first mobility management network element to the second network element in the second private network may be used to obtain the downlink routing information, where the downlink routing information is used to indicate the transmission of the downlink data from the first user plane entity in the first private network to the second user plane entity in the second private network. In this way, when receiving the downlink data, the first user plane entity may send the downlink data to the second user plane entity based on the downlink data routing information, so as to maintain service continuity.

According to a thirteenth aspect, a communication system is provided. The communication system includes a first mobility management network element and a first network element. The first network element is configured to obtain a first cell identifier and a network identifier, where the network identifier includes an identifier of a first private network, and the first network element serves a terminal device in the first private network. The first network element is further configured to determine, based on the first cell identifier, that an area in which the terminal device is currently located is beyond a service range of a cell identified by the first cell identifier. The first network element is further configured to send the first cell identifier and the network identifier to the first mobility management network element. The first mobility management network element is configured to receive the first cell identifier and the network identifier from the first network element. The first mobility management network element is further configured to determine, based on the first cell identifier and the network identifier, that a second mobility management network element currently serves the terminal device in a public network. The first mobility management network element is further configured to determine a centralized unit-control plane entity that serves the terminal device and that is in the public network. The first mobility management network element is further configured to send the first cell identifier and the network identifier to the centralized unit-control plane entity in the public network, where the first cell identifier and the network identifier are used to obtain downlink routing information, and the downlink routing information is used to indicate transmission of downlink data from a first user plane entity in the first private network to a second user plane entity in the public network. In this solution, after moving out of coverage of the first private network, the terminal device may select the public network, and the first mobility management network element in the public network may send the first cell identifier and the network identifier to the centralized unit-control plane entity in the public network, where the first cell identifier and the network identifier are used to obtain the downlink routing information, and the downlink routing information is used to indicate the transmission of the downlink data from the first user plane entity in the first private network to the second user plane entity in the public network. In this way, when receiving the downlink data, the first user plane entity may send the downlink data to the second user plane entity based on the downlink data routing information, so as to maintain service continuity.

BRIEF DESCRIPTION OF DRAWINGS

FIG. 8*b*-1, FIG. 8*b*-2, FIG. 8*b*-3, FIG. 8*b*-4, and FIG. 8*b*-5 are a schematic interaction flowchart 1 of a communication method according to an embodiment of this application;

FIG. 9*b*-1, FIG. 9*b*-2, FIG. 9*b*-3, FIG. 9*b*-4, and FIG. 9*b*-5 are a schematic interaction flowchart 2 of a communication method according to an embodiment of this application;

DESCRIPTION OF EMBODIMENTS

The following describes technical solutions in embodiments of this application with reference to the accompanying drawings in some embodiments of this application. In descriptions of this application, "/" represents an "or" relationship between associated objects unless otherwise specified. For example, A/B may represent A or B. The term "and/or" in this application describes only an association relationship between associated objects and indicates that three relationships may exist. For example, A and/or B may indicate the following three cases: Only A exists, both A and B exist, and only B exists, where A and B may be singular or plural. In addition, unless otherwise specified, "a plurality of" in the descriptions of this application means two or more than two. "At least one item (piece) of the following" or a similar expression thereof means any combination of the items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, for convenience of clear description of the technical solutions in some embodiments of this application, in some embodiments of this application, terms such as "first" and "second" are used to distinguish between same objects or similar objects whose functions and purposes are basically the same. A person skilled in the art may understand that the terms such as "first" and "second" do not constitute a limitation on a quantity or an execution sequence, and that the terms such as "first" and "second" do not indicate a definite difference. In addition, in some embodiments of this application, a word such as "example" or "for example" is used to represent giving an example, an illustration, or a description. Any embodiment or design scheme described as "example" or "for example" in some embodiments of this application should not be explained as being more preferred or having more advantages than another embodiment or design scheme. Exactly, use of the word such as "example" or "for example" is intended to present a relative concept in a specific manner for ease of understanding.

In addition, a network architecture and a service scenario that are described in some embodiments of this application are intended to describe the technical solutions in some embodiments of this application more clearly, and do not constitute a limitation on the technical solutions provided in some embodiments of this application. A person of ordinary skill in the art may learn that with evolution of the network architecture and emergence of a new service scenario, the technical solutions provided in some embodiments of this application are also applicable to similar technical problems.

Figure 1:
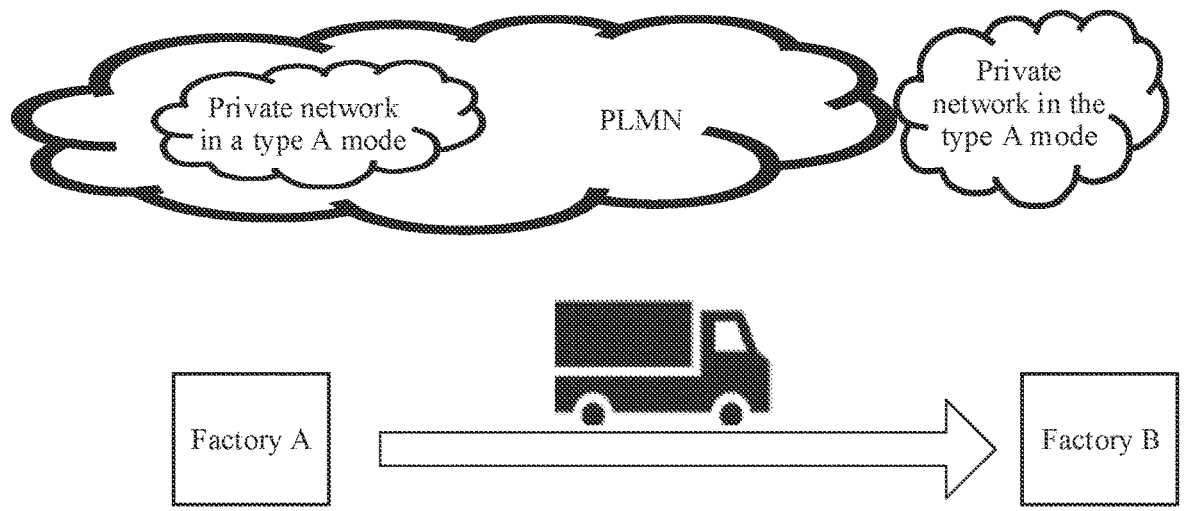
FIG. 1 is a schematic diagram of an existing user terminal moving scenario.
Figure 2:
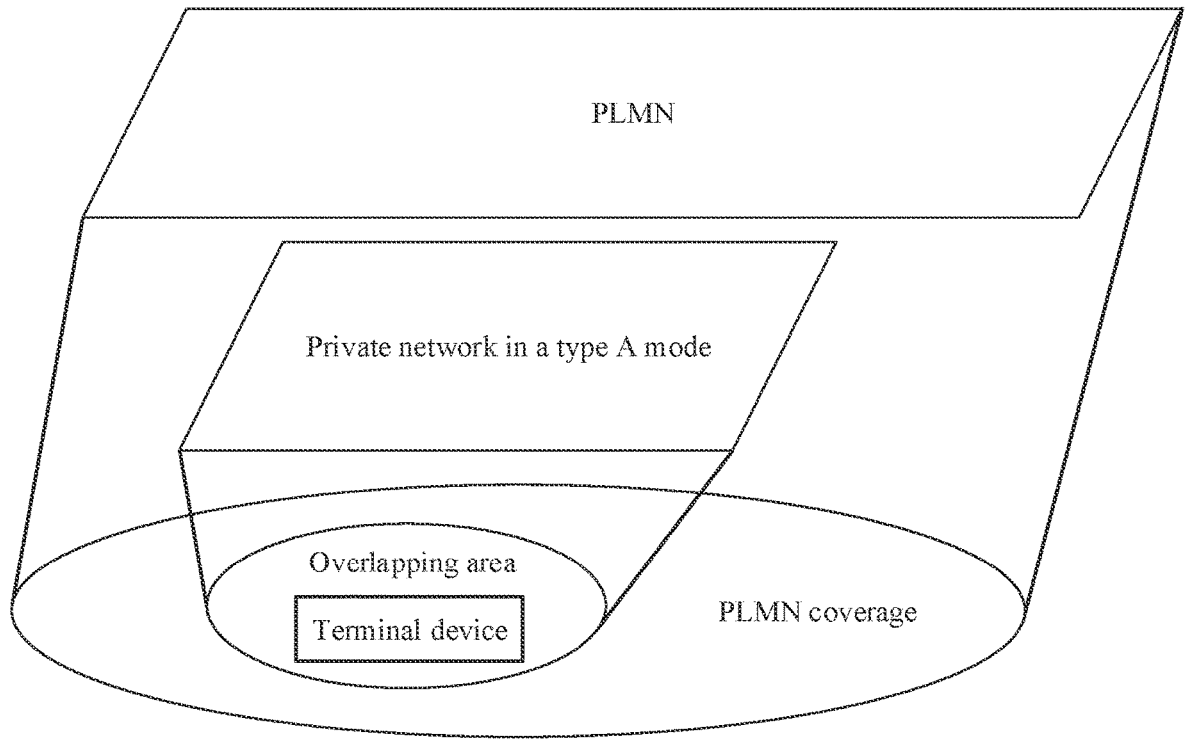
FIG. 2 is a schematic diagram of existing deployment of a PLMN and a private network in a type A mode.
Figure 3:
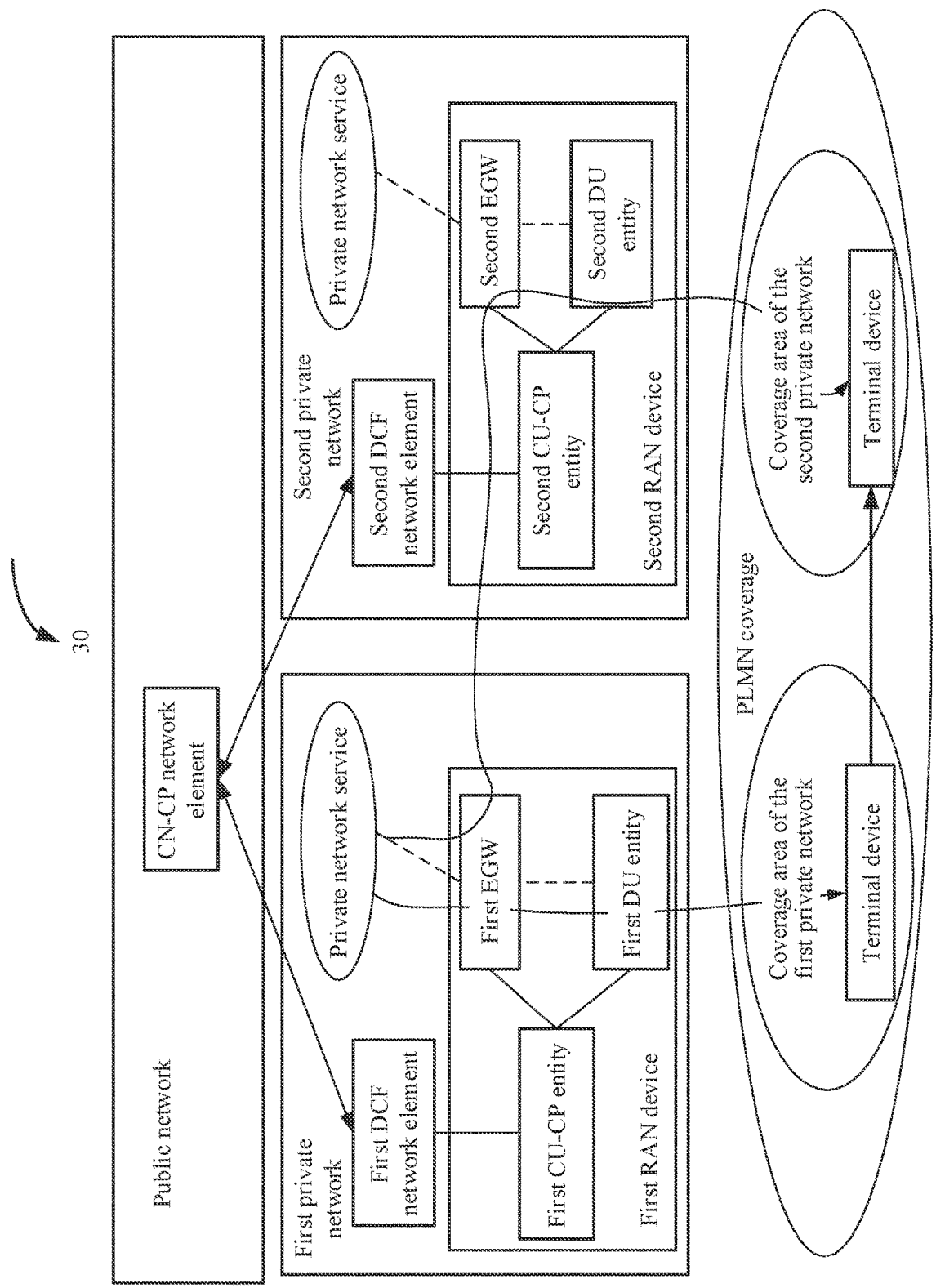
FIG. 3 is a schematic diagram 1 of a communication system according to an embodiment of this application.

FIG. 3 shows a communication system 30 according to an embodiment of this application. The communication system 30 includes a public network (which may be, for example, a PLMN), a first private network, and a second private network. Both the first private network and the second private network are private networks in a type A mode. It should be noted that the private network in this embodiment of this application may also be referred to as a non-public network.

For example, as shown in FIG. 3, the public network may include a core network-control plane (CN-CP) network element, a core network-user plane (CN-UP) network element (not shown in the figure), and a RAN device (not shown in the figure). The first private network may include a first network element (which may be, for example, a first distributed control function (DCF) network element in FIG. 3) and a first radio access network (RAN) device. The first RAN device includes a first centralized unit-control plane (CU-CP) entity, a first distributed unit (DU) entity, and a first user plane entity (which may be, for example, a first edge gateway (EGW) in FIG. 3). The second private network may include a second network element (which may be, for example, a second DCF network element in FIG. 3) and a second RAN device. The second RAN device includes a second CU-CP entity, a second DU entity, and a second user plane entity (which may be, for example, a second EGW in FIG. 3). The CN-CP network element in the public network is separately connected to the first DCF network element in the first private network and the second DCF network element in the second private network. The first DCF network element in the first private network is connected to the first CU-CP entity in the first private network, and the first CU-CP entity in the first private network is separately connected to the first EGW and the first DU entity in the first private network. The second DCF network element in the second private network is connected to the second CU-CP entity in the second private network, and the second CU-CP entity in the second private network is separately connected to the second EGW and the second DU entity in the second private network.

FIG. 3 describes a case in which a terminal device moves from a coverage area of the first private network to a coverage area of the second private network. Because the DCF 1 network element does not know a network topology of a target area in which the terminal device is located, a public network with which the terminal device registers needs to cooperate to complete mobility handover processing.

The CN-CP network element in this embodiment of this application may include a mobility management network element, a unified data management network element, a session management network element, a network repository function network element, an authentication function network element, or the like. The mobility management network element is mainly used for mobility management in a mobile network, for example, user location update, registration of a user with a network, and user handover. The session management network element mainly provides session management functions, including functions such as user equipment (UE) interne protocol (IP) address allocation, user plane function (UPF) entity selection, or policy and charging control (PCC) policy enforcement. The network repository function network element mainly provides a network function (NF) registration or discovery function, and functions such as maintaining and managing an NF status (including information such as a cell/PLMN/radio access type (RAT) supported by an NF) and a service type supported by the NF. The unified data management network element is mainly responsible for user identity processing, access authentication, registration, mobility management, and the like. The authentication function network element is mainly configured to perform authentication and authorization and the like.

Figure 4:
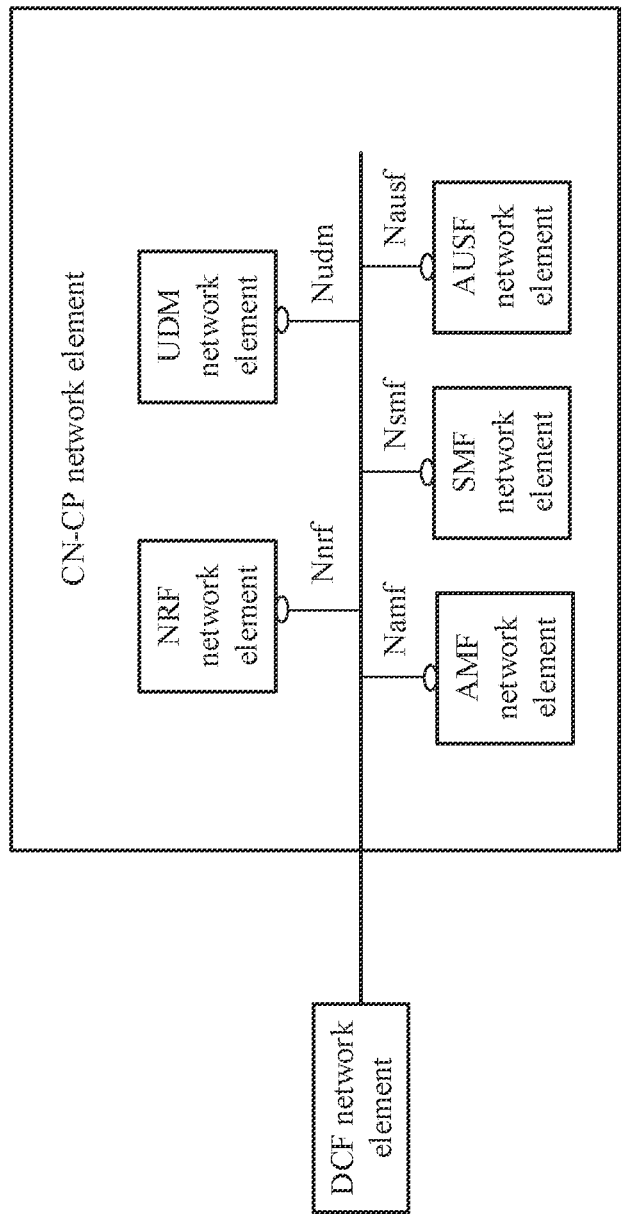
FIG. 4 is a schematic diagram of a CN-CP network element in a 5G network according to an embodiment of this application.

For example, as shown in FIG. 4, in a 5th generation (5G), the mobility management network element may be an access and mobility management function (AMF) network element, the session management network element may be a session management function (SMF) network element, the authentication function network element may be an authentication server function (AUSF) network element, the unified data management network element may be a unified data management (UDM) network element, and the network repository function network element may be a network repository function (NRF) network element. Certainly, in another future network, the mobility management network element, the unified data management network element, the session management network element, the network repository function network element, or the authentication function network element may each be another network element. This is not specifically limited in this embodiment of this application.

Optionally, the CN-CP network element such as the AMF network element, the SMF network element, the UDM network element, the AUSF network element, or the NRF network element in this embodiment of this application may interact with each other through a service-oriented interface. For example, as shown in FIG. 4, a service-oriented interface externally provided by the AMF network element may be Namf, a service-oriented interface externally provided by the SMF network element may be Nsmf, a service-oriented interface externally provided by the UDM network element may be Nudm, a service-oriented interface externally provided by the NRF network element may be Nnrf, and a service-oriented interface externally provided by the AUSF network element may be Nausf. For related descriptions, refer to a 5G system architecture in the standard 23501. Details are not described herein.

The CN-UP network element in this embodiment of this application may include a user plane entity. The user plane entity is mainly configured to forward a user data packet according to a routing rule of the session management network element. In a 5G network, the user plane entity may be a UPF entity. In another future network, the user plane entity may be another entity. This is not specifically limited in this embodiment of this application.

A DCF network element (including the first DCF network element in FIG. 3, the second DCF network element in FIG. 3, or another DCF network element in a subsequent embodiment) in this embodiment of this application is responsible for non-access stratum (NAS) parsing and encryption and decryption. The DCF network element supports control-type user data transmission, local mobility management, session management, charging, lawful interception, UE IP address allocation for a local user, paging, local service capability exposure, and the like.

Figure 5:
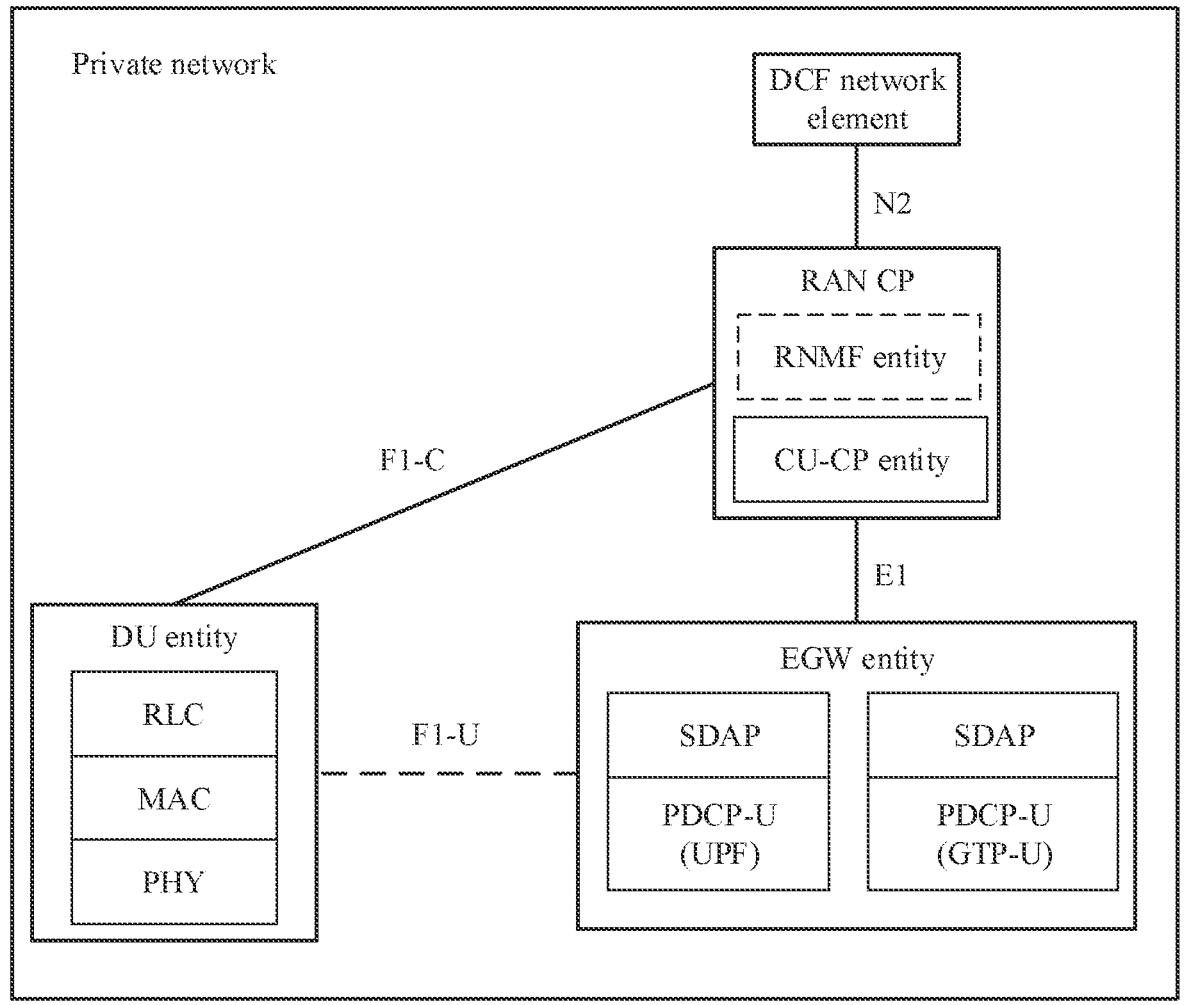
FIG. 5 is a schematic diagram of connections and structures of network elements in a private network according to an embodiment of this application.

As shown in FIG. 5, a CU-CP entity (including the first CU-CP entity in FIG. 3, the second CU-CP entity in FIG. 3, or another CU-CP entity in a subsequent embodiment) in this embodiment of this application is included in a RAN CP and is responsible for a radio resource control function, where the radio resource control function includes system message broadcasting, radio resource control (RRC) connection management (for example, RRC connection setup/reconfiguration/release), mobility management (for example, measurement control, measurement reporting, and handover), encryption and decryption of control plane signaling, parsing of a packet data unit (PDU) session resource parameter, or the like.

An EGW entity (including the first EGW entity in FIG. 3, the second EGW entity in FIG. 3, or another EGW entity in a subsequent embodiment) in this embodiment of this application may be divided based on protocol layers of a wireless network. For example, as shown in FIG. 5, a packet data convergence protocol-user plane (PDCP-U) protocol layer and a service data adaptation protocol stack (SDAP) protocol layer may be disposed in the EGW entity. The PDCP-U is responsible for functions such as encryption and decryption of user plane data, integrity protection, or sequential data forwarding. The SDAP enhances support for mapping an IP data packet to a data radio bearer (DRB) based on a packet filter.

A DU entity (including the first DU entity in FIG. 3, the second DU entity in FIG. 3, or another DU entity in a subsequent embodiment) in this embodiment of this application may be divided based on the protocol layers of the wireless network. For example, as shown in FIG. 5, functions of a radio link control (RLC) protocol layer, a media access control (MAC) protocol layer, and a physical (PHY) protocol layer may be disposed in the DU entity.

It may be understood that, division into processing functions of the EGW entity and the DU entity based on the protocol layers is merely an example, and the processing functions of the EGW entity and the DU entity may alternatively be divided in another manner. This is not specifically limited in this embodiment of this application.

Optionally, as shown in FIG. 5, a RAN CP of a first RAN device or of a second RAN device in this embodiment of this application may further include a radio network management function (RNMF) entity, and the RNMF entity includes a RAN service-oriented NF management function, RAN function control (such as functions of a handover decision and paging), or an interface communication function.

In addition, as shown in FIG. 5, in this embodiment of this application, the DU entity and the RAN CP may be connected through an F1-C interface, the DU entity and the EGW entity may be connected through an F1-U interface, the EGW entity and the RAN CP entity may be connected through an E1 interface, and the RAN CP entity and the DCF network element is connected through an N2 interface. When the RAN CP includes only the CU-CP entity, the RAN CP in this embodiment of this application may be replaced with the CU-CP entity. A general description is provided herein, and details are not described below.

Figure 6:
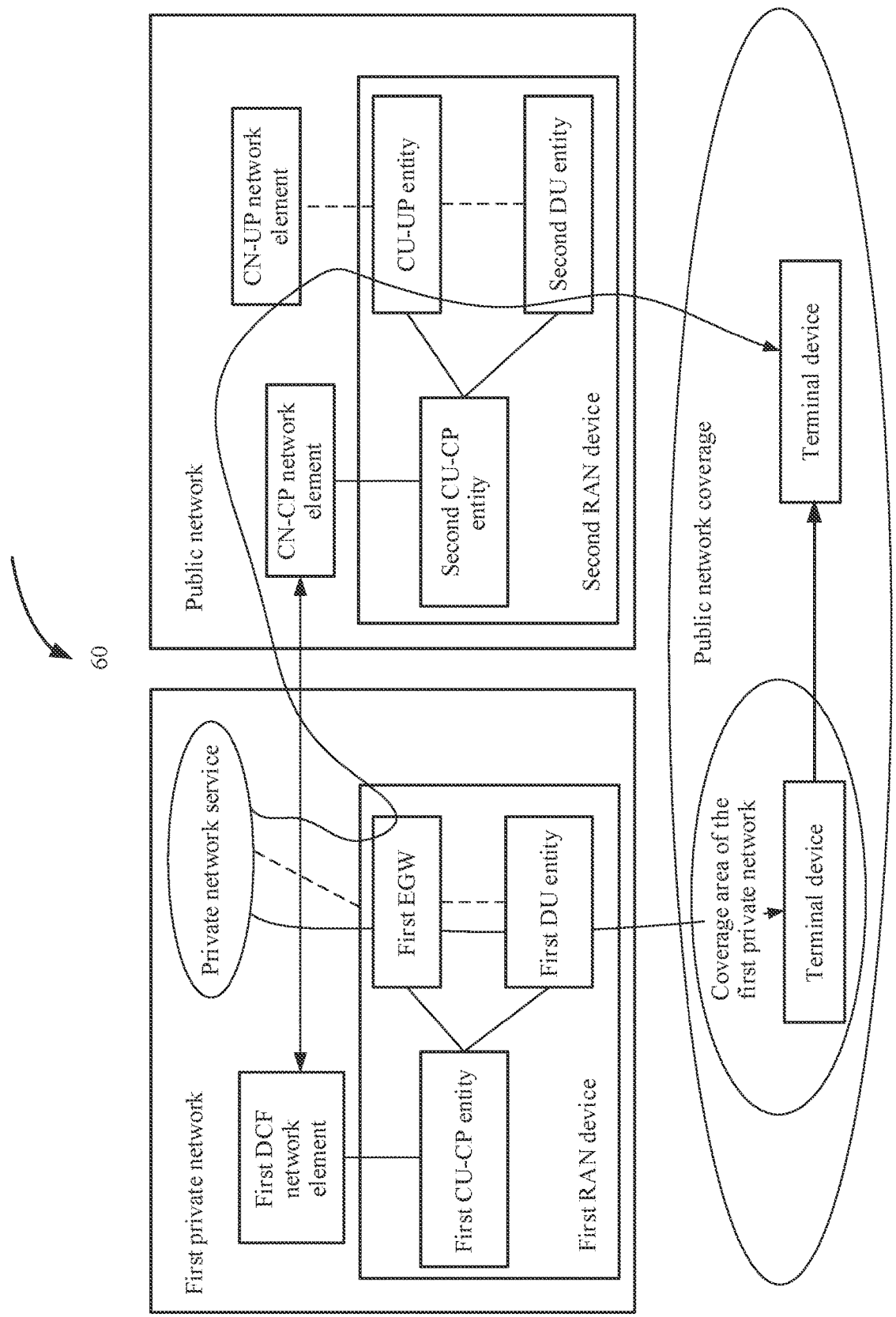
FIG. 6 is a schematic diagram 2 of a communication system according to an embodiment of this application.

Optionally, FIG. 6 shows another communication system 60 according to an embodiment of this application. The communication system 60 includes a public network (which may be, for example, a PLMN) and a first private network. The first private network is a private network in a type A mode.

For example, as shown in FIG. 6, the public network may include a CN-CP network element, a CN-UP network element, and a second RAN device. The second RAN device may include a second CU-CP entity, a CU-UP entity, and a second DU entity. The first private network may include a first network element (which may be, for example, a first DCF network element in FIG. 6) and a first RAN device. The first RAN device includes a first CU-CP entity, a first DU entity, and a first user plane entity (which may be, for example, a first EGW in FIG. 6). The first DCF network element in the first private network is connected to the first CU-CP entity in the first private network, and the first CU-CP entity in the first private network is separately connected to the first EGW and the first DU entity in the first private network. The first DCF network element in the first private network is further connected to the CN-CP network element in the public network, and the CN-CP network element in the public network is connected to the second CU-CP entity in the public network. The second CU-CP entity in the public network is separately connected to the CU-UP entity and the second DU entity in the public network, and the CN-UP network element in the public network is connected to the CU-UP entity in the public network.

FIG. 6 describes a case in which a terminal device moves from a coverage area of the first private network to a coverage area of the public network. Because the DCF 1 network element does not know a network topology of a target area in which the terminal device is located, a public network with which the terminal device registers needs to cooperate to complete mobility handover processing.

For related descriptions of the CN-CP network element, the CN-UP network element, the DCF network element, the CU-UP entity, the EGW, and the DU entity in this embodiment of this application, refer to the embodiment shown in FIG. 4 or FIG. 5. Details are not described herein again.

The CU-UP entity in this embodiment of this application is responsible for a user plane function, and mainly includes an SDAP protocol layer and a PDCP user plane (PDCP-U) protocol layer. For related descriptions, refer to a conventional technology. Details are not described herein again.

Optionally, the terminal device in this embodiment of this application may be a device such as a terminal or a chip that may be used in a terminal, configured to implement a wireless communication function. The terminal may be user equipment (UE), an access terminal, a terminal unit, a terminal station, a mobile station, a mobile console, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self-driving (self-driving), a wireless terminal in remote medical, a wireless terminal in a smart grid, a wireless terminal in transportation safety (transportation safety), a wireless terminal in a smart city, a wireless terminal in a smart home, or the like. The terminal may be mobile or fixed.

Optionally, the RAN device in this embodiment of this application is a device for accessing the terminal device to a wireless network, and may be an evolved NodeB (evolutional Node B, eNB or eNodeB) in long term evolution (LTE), a base station in the 5G network or the future evolved PLMN, a broadband network service gateway (BNG), an aggregation switch, a non-3GPP access device, or the like. This is not specifically limited in this embodiment of this application. The base station in this embodiment of this application may include base stations in various forms, for example, a macro base station, a micro base station (which is also referred to as a small cell), a relay station, and an access point. This is not specifically limited in this embodiment of this application.

Optionally, a mobility management network element (for example, a first AMF network element in a subsequent method embodiment) in this embodiment of this application or the first network element may also be referred to as a communication device, and may be a general-purpose device or a dedicated device. This is not specifically limited in this embodiment of this application.

Optionally, a related function of the mobility management network element or the first network element in this embodiment of this application may be implemented by one device, may be jointly implemented by a plurality of devices, or may be implemented by one or more function modules in one device. This is not specifically limited in this embodiment of this application. It may be understood that the foregoing function may be a function of a network element on a hardware device, a function of software running on dedicated hardware, a function of a combination of hardware and software, or may be a virtualization function instantiated on a platform (for example, a cloud platform).

Figure 7:
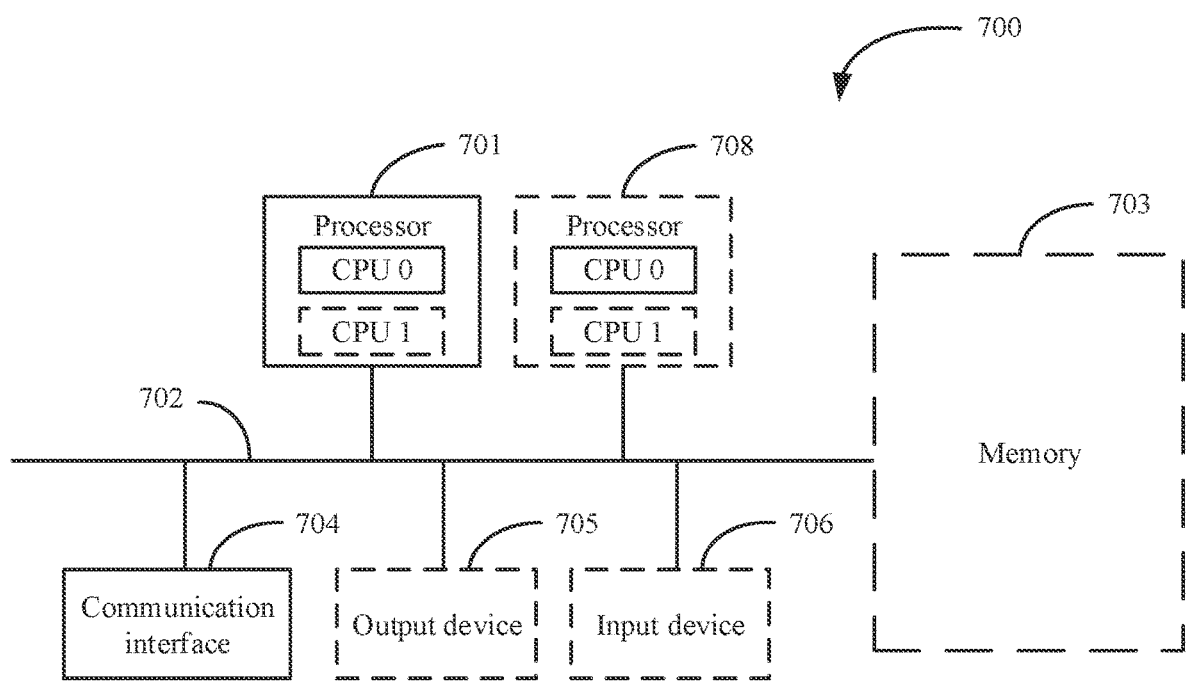
FIG. 7 is a schematic structural diagram of a communication device according to an embodiment of this application.

For example, the related function of the mobility management network element or the first network element in this embodiment of this application may be implemented by a communication device 700 in FIG. 7. FIG. 7 is a schematic structural diagram of a communication device 700 according to an embodiment of this application. The communication device 700 includes one or more processors 701, a communication line 702, and at least one communication interface (only an example in which the communication device 700 includes a communication interface 704 and one processor 701 is used in FIG. 7 for description). Optionally, the communication device 700 may further include a memory 703.

The processor 701 may be a general-purpose central processing unit (CPU), a microprocessor, an application-specific integrated circuit (ASIC), or one or more integrated circuits configured to control program execution in the solutions of this application.

The communication line 702 may include a path, to connect different components.

The communication interface 704 may be a transceiver module configured to communicate with another device or a communication network, for example, the Ethernet, a RAN, or a wireless local area network (WLAN). For example, the transceiver module may be an apparatus such as a transceiver or a transceiver component. Optionally, the communication interface 704 may alternatively be a transceiver circuit located inside the processor 701, and is configured to implement signal input and signal output of the processor.

The memory 703 may be an apparatus having a storage function. For example, the memory 703 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, or any other medium that can be used to carry or store expected program code in instructions or data structure form and that can be accessed by a computer. However, this is not limited herein. The memory may exist independently and is connected to the processor through the communication line 702. The memory may alternatively be integrated with the processor.

The memory 703 is configured to store computer-executable instructions for executing the solutions of this application, and the processor 701 controls the execution. The processor 701 is configured to execute the computer-executable instructions stored in the memory 703, to implement the communication method provided in this embodiment of this application.

Alternatively, optionally, in this embodiment of this application, the processor 701 may perform processing related functions in a communication method provided in the following embodiment in this application, and the communication interface 704 is responsible for communication with another device or a communication network. This is not specifically limited in this embodiment of this application.

Optionally, the computer-executable instructions in this embodiment of this application may also be referred to as application program code. This is not specifically limited in this embodiment of this application.

During specific implementation, in an embodiment, the processor 701 may include one or more CPUs, for example, a CPU 0 and a CPU 1 in FIG. 7.

During specific implementation, in an embodiment, the communication device 700 may include a plurality of processors, for example, the processor 701 and a processor 708 in FIG. 7. Each of the processors may be a single-core (single-CPU) processor or a multi-core (multi-CPU) processor. The processors herein may be one or more devices, circuits, and/or processing cores for processing data (for example, computer program instructions).

During specific implementation, in an embodiment, the communication device 700 may further include an output device 705 and an input device 706. The output device 705 communicates with the processor 701, and may display information in a plurality of manners. For example, the output device 705 may be a liquid crystal display (LCD), a light emitting diode (LED) display device, a cathode ray tube (CRT) display device, or a projector. The input device 706 communicates with the processor 701, and may receive an input of a user in a plurality of manners. For example, the input device 706 may be a mouse, a keyboard, a touchscreen device, or a sensing device.

The communication device 700 may also be referred to as a communication apparatus sometimes, and may be a general-purpose device or a dedicated device. For example, the communication device 700 may be a desktop computer, a portable computer, a network server, a palmtop computer (personal digital assistant, PDA), a mobile phone, a tablet computer, a wireless terminal device, an embedded device, the foregoing terminal device, the foregoing network device, or a device having a structure similar to the structure shown in FIG. 7. A type of the communication device 700 is not limited in this embodiment of this application.

The following describes in detail a communication method provided in embodiments of this application with reference to FIG. 3 to FIG. 7.

It should be noted that in the following embodiments of this application, names of messages between network elements, names of parameters in the messages, or the like are merely examples, and may be other names during specific implementation. This is not specifically limited in the embodiments of this application.

Figure 8A:
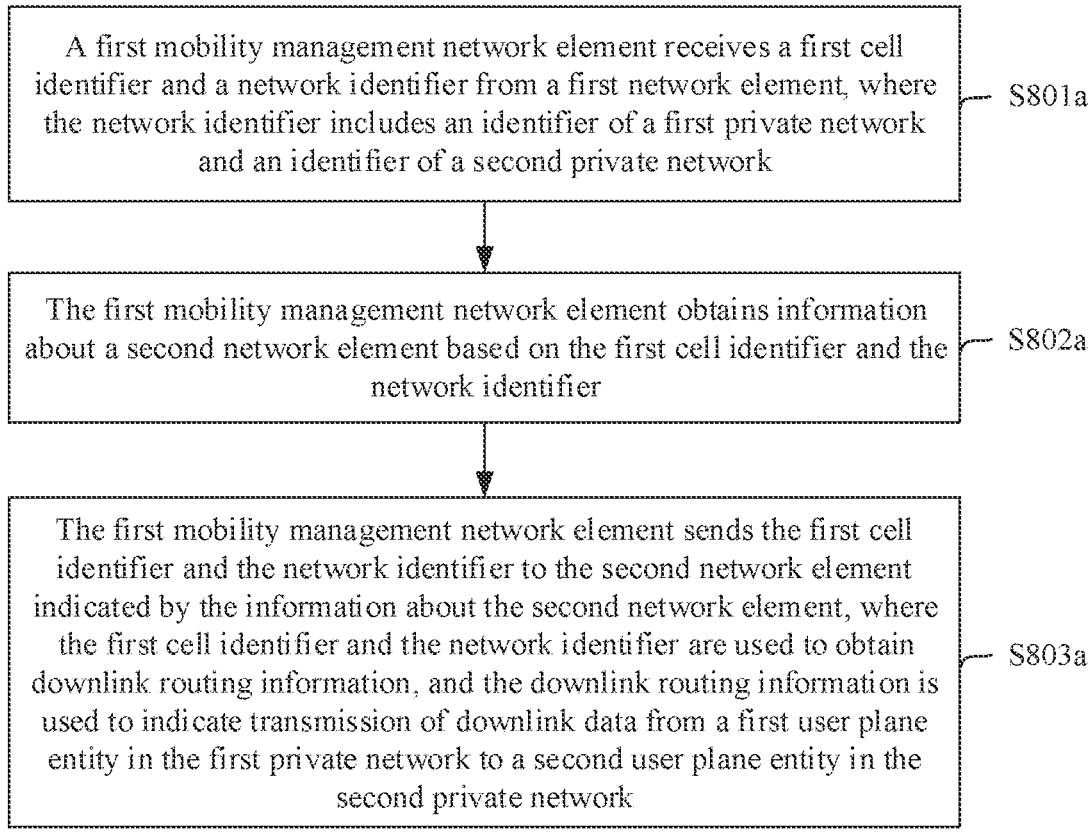
FIG. 8*a* is a schematic flowchart 1 of a communication method according to an embodiment of this application.
Figures 4, 8B:
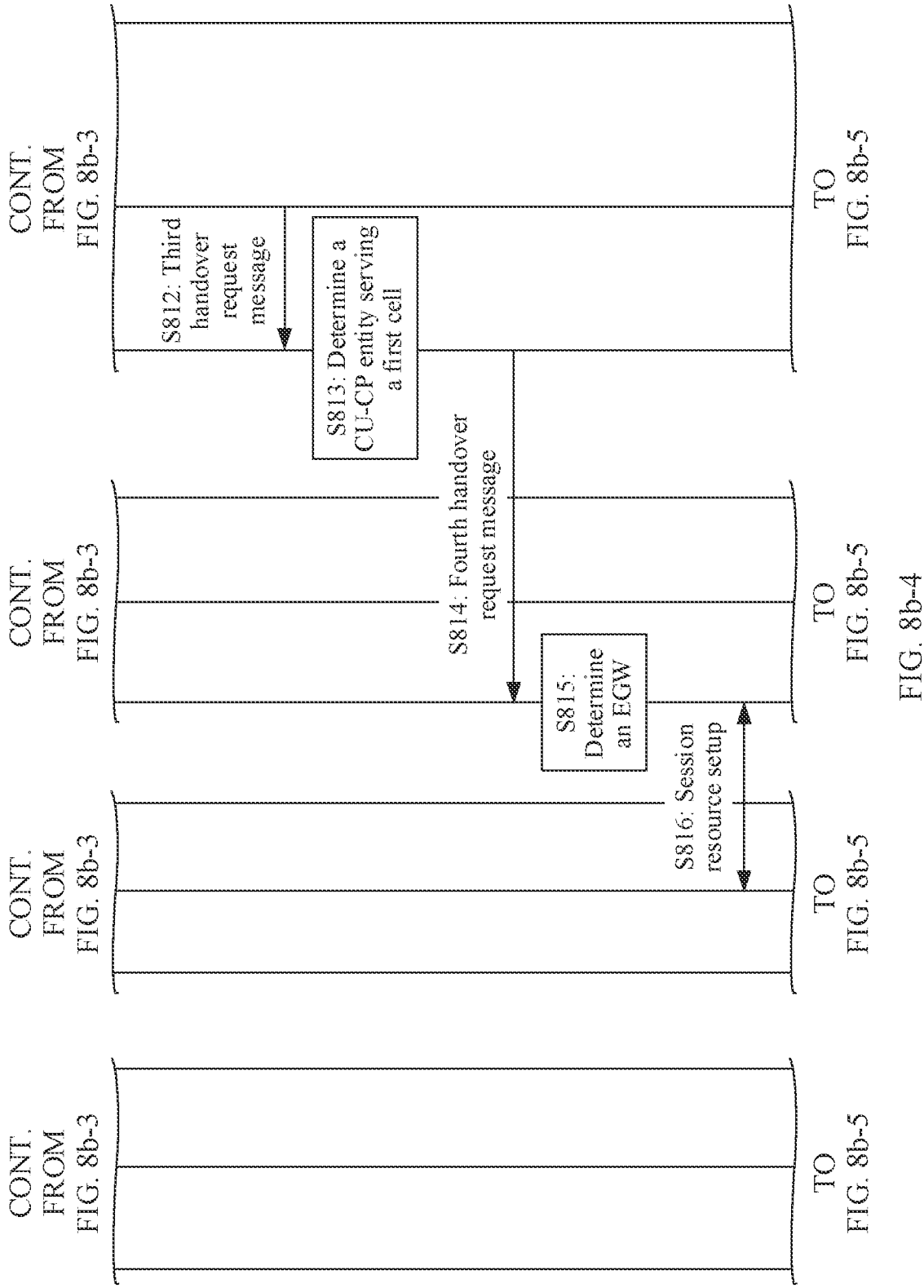

First, it is assumed that a terminal device may access a plurality of private networks in a type A mode, and the terminal device moves from a coverage area of a first private network to a coverage area of a second private network (the scenario shown in FIG. 3). FIG. 8a shows a communication method according to an embodiment of this application. The communication method includes the following steps S801a to S803a.

S801a: A first mobility management network element receives a first cell identifier and a network identifier from a first network element, where the network identifier includes an identifier of a first private network and an identifier of a second private network.

S802a: The first mobility management network element obtains information about a second network element based on the first cell identifier and the network identifier.

The first network element serves a terminal device in the first private network, and the second network element serves the terminal device in the second private network.

S803a: The first mobility management network element sends the first cell identifier and the network identifier to the second network element indicated by the information about the second network element. The first cell identifier and the network identifier are used to obtain downlink routing information, and the downlink routing information is used to indicate transmission of downlink data from a first user plane entity in the first private network to a second user plane entity in the second private network.

Based on the communication system, after the terminal device moves out of coverage of the first private network, the terminal device can be handed over to a target cell, and service continuity can be ensured. Specific implementation of this solution is described in detail by using an interaction procedure between network elements shown in FIG. 8b-1, FIG. 8b-2, FIG. 8b-3, FIG. 8b-4, and FIG. 8b-5, and details are not described herein again.

For example, a public network is a 5G network, the first mobility management network element is a first AMF network element, the first network element is the first DCF network element in FIG. 3, the second network element is the second DCF network element in FIG. 3, the first user plane entity is the first EGW in FIG. 3, and the second user plane entity is the second EGW in FIG. 3. FIG. 8b-1, FIG. 8b-2, FIG. 8b-3, FIG. 8b-4, and FIG. 8b-5 show a communication method according to an embodiment of this application. The communication method includes the following steps.

S801: A first CU-CP entity in a first private network determines, based on a measurement report reported by a terminal device, that handover processing needs to be performed on the terminal device.

In this embodiment of this application, after determining that the handover processing needs to be performed on the terminal device, the first CU-CP entity may further determine a target cell to which the terminal device is to be handed over. An example in which the target cell is a first cell is used for description in this embodiment of this application.

S802: The first CU-CP entity sends a first handover (HO) request message to a first DCF network element. The first DCF network element receives the first handover request message from the first CU-CP entity.

The first handover request message includes a first cell identifier, and the first cell identifier is used to identify the first cell.

Optionally, the first handover request message may further include information such as a terminal device identifier (for example, a 5G-globally unique temporary UE identity (GUTI) or a system architecture evolution (SAE) temporary mobile subscriber identity (S-TMSI)), a terminal device context, a data network name (DNN), a quality of service (QoS) profile, and a packet filter corresponding to the QoS profile. This is not specifically limited in this embodiment of this application. The DNN identifies a data network name of a service accessed by the terminal device. The QoS profile is QoS parameter information sent to a RAN network function (including a CU entity, a DU entity, or the like), and includes an allocation and retention priority (ARP), a guaranteed flow bit rate (GFBR), a maximum flow bit rate (MFBR), a maximum packet loss rate (MPLR), and the like.

S803: The first DCF network element determines, based on the first cell identifier, that an area in which the terminal device is currently located is beyond a service range of a cell identified by the first cell identifier.

S804: The first DCF network element sends a second handover request message to a first AMF network element, and the first AMF network element receives the second handover request message from the first DCF network element.

The second handover request message includes a parameter and a network identifier in the first handover request message. The network identifier includes an identifier of a private network that can be accessed by the terminal device. In this embodiment of this application, an example in which the network identifier includes an identifier of the first private network and an identifier of a second private network is used for description.

After obtaining the first cell identifier and the network identifier, the first AMF network element may determine, based on the first cell identifier and the network identifier, whether a DCF network element is deployed in the first cell identified by the first cell identifier. Two implementations are provided as examples below.

In a possible implementation, as shown in FIG. 8b-1, FIG. 8b-2, FIG. 8b-3, FIG. 8b-4, and FIG. 8b-5, the communication method further includes the following steps S805a to S807a.

S805a: The first AMF network element determines that the first cell identifier belongs to a first tracking area (TA) list allocated by the first AMF network element to the terminal device.

The first AMF network element may allocate the first TA list to the terminal device in a registration process, where the first TA list identifies a location area in which the terminal device registers. For specific implementation, refer to a subsequent registration procedure. Details are not described herein.

S806a: The first AMF network element sends a first network service query request message to an NRF network element. The NRF network element receives the first network service query request message from the first AMF network element.

The first network service query request message includes a network function (NF) type (namely, a DCF), the first cell identifier, and the network identifier.

Optionally, the first network service query request message in this embodiment of this application may alternatively be replaced with a first NF service request message. This is not specifically limited herein.

S807a: The NRF network element determines that a DCF network element is deployed in the first cell identified by the first cell identifier, and determines, based on the network identifier, that the deployed DCF network element supports the private network that can be accessed by the terminal device.

For example, the NRF network element determines whether the DCF network element is deployed in the first cell identified by the first cell identifier, and determines, based on the network identifier, whether the deployed DCF network element supports the private network that can be accessed by the terminal device. If the NRF network element determines that the DCF network element is deployed in the first cell identified by the first cell identifier, and determines, based on the network identifier, that the deployed DCF network element supports the private network that can be accessed by the terminal device, the NRF network element sends a first network service query response message to the first AMF network element. The first AMF network element receives the first network service query response message from the NRF network element. The first network service query response message includes information about a second DCF network element. The information about the second DCF network element is used to indicate the second DCF network element.

Optionally, in this embodiment of this application, the information about the second DCF network element may include an IP address of the second DCF network element. This is not specifically limited herein.

Certainly, if the NRF network element determines that the DCF network element is deployed in the first cell identified by the first cell identifier, but the DCF network element does not support any private network that can be accessed by the terminal device; or if the NRF network element determines that no DCF network element is deployed in the first cell identified by the first cell identifier, the NRF network element may also send a network service query response message to the first AMF network element. The network service query response message does not include information about the DCF network element. This is not specifically limited in this embodiment of this application.

Optionally, the first network service query response message in this embodiment of this application may alternatively be replaced with a first NF service response message. This is not specifically limited herein.

Alternatively, in another possible implementation, as shown in FIG. 8b-1, FIG. 8b-2, FIG. 8b-3, FIG. 8b-4, and FIG. 8b-5, the communication method further includes the following steps S805b to S811b.

S805b: The first AMF network element determines that the first cell identifier does not belong to a first TA list allocated by the first AMF network element to the terminal device.

The first AMF network element may allocate the first TA list to the terminal device in a registration process, where the first TA list identifies a location area in which the terminal device registers. For specific implementation, refer to a subsequent registration procedure. Details are not described herein.

S806b: The first AMF network element sends a second network service query request message to an NRF network element. The NRF network element receives the second network service query request message from the first AMF network element.

The second network service query request message includes the first cell identifier and an NF type (namely, an AMF).

Optionally, the second network service query request message in this embodiment of this application may alternatively be replaced with a second NF service request message. This is not specifically limited herein.

S807b: The NRF network element determines that a mobility management network element that can serve the first cell identified by the first cell identifier exists.

For example, the NRF network element determines whether the mobility management network element that can serve the first cell identified by the first cell identifier exists. If the mobility management network element that can serve the first cell identified by the first cell identifier exists, the NRF network element sends a second network service query response message to the first AMF network element. The first AMF network element receives the second network service query response message from the NRF network element. Assuming that the mobility management network element that can serve the first cell identified by the first cell identifier is a second AMF network element, the second network service query response message may include information about the second AMF network element. The information about the second AMF network element is used to indicate the second AMF network element.

Optionally, in this embodiment of this application, the information about the second AMF network element may include, for example, an IP address of the second AMF network element. This is not specifically limited herein.

Certainly, if the NRF network element determines that no mobility management network element that can serve the first cell identified by the first cell identifier exists, the NRF network element may also send a network service query response message to the first AMF network element. The network service query response message does not include information about an AMF network element. This is not specifically limited in this embodiment of this application.

S808b: The first AMF network element sends a first N14 message to the second AMF network element indicated by the information about the second AMF network element. The second AMF network element receives the first N14 message from the first AMF network element.

The first N14 message includes the first cell identifier and the network identifier.

S809b: The second AMF network element sends a third network service query request message to the NRF network element. The NRF network element receives the third network service query request message from the second AMF network element.

The third network service query request message includes an NF type (that is, a DCF), the first cell identifier, and the network identifier.

Optionally, the third network service query request message in this embodiment of this application may alternatively be replaced with a third NF service request message. This is not specifically limited herein.

S810b: The NRF network element determines that a DCF network element is deployed in the first cell identified by the first cell identifier, and determines, based on the network identifier, that the deployed DCF network element supports the private network that can be accessed by the terminal device.

For example, the NRF network element determines whether the DCF network element is deployed in the first cell identified by the first cell identifier, and determines, based on the network identifier, whether the deployed DCF network element supports the private network that can be accessed by the terminal device. If the NRF network element determines that a DCF network element is deployed in the first cell identified by the first cell identifier, and determines, based on the network identifier, that the deployed DCF network element supports the private network that can be accessed by the terminal device, the NRF network element sends a third network service query response message to the second AMF network element. The second AMF network element receives the third network service query response message from the NRF network element. The third network service query response message includes information about a second DCF network element. The information about the second DCF network element is used to indicate the second DCF network element.

Certainly, if the NRF network element determines that the DCF network element is deployed in the first cell identified by the first cell identifier, but the DCF network element does not support any private network that can be accessed by the terminal device; or if the NRF network element determines that no DCF network element is deployed in the first cell identified by the first cell identifier, the NRF network element may also send a network service query response message to the first AMF network element. The network service query response message does not include information about the DCF network element. This is not specifically limited in this embodiment of this application.

Optionally, in this embodiment of this application, the information about the second DCF network element may include an IP address of the second DCF network element. This is not specifically limited herein.

Optionally, the third network service query response message in this embodiment of this application may alternatively be replaced with a third NF service response message. This is not specifically limited herein.

S811b: The second AMF network element sends a second N14 message to the first AMF network element. The first AMF network element receives the second N14 message from the second AMF network element.

The second N14 message includes the information about the second DCF network element.

Further, in this embodiment of this application, after the AMF 1 network element obtains the information about the second DCF network element, the communication method provided in this embodiment of this application may further include the following steps.

S812: The first AMF network element sends a third handover request message to the second DCF network element indicated by the information about the second DCF network element. The second DCF network element receives the third handover request message from the first AMF network element.

The third handover request message includes parameters such as the first cell identifier and the network identifier in the second handover request message.

S813: The second DCF network element determines a CU-CP entity serving the first cell, where it is assumed that the CU-CP entity is a second CU-CP entity herein.

Optionally, in this embodiment of this application, the second DCF network element may determine the CU-CP entity serving the first cell based on information such as the first cell identifier, a RAT type (that is, a current access standard of the terminal device, for example, LTE or a new radio (NR)), or PLMN information.

S814: The second DCF network element sends a fourth handover request message to the second CU-CP entity. The second CU-CP entity receives the fourth handover request message from the second DCF network element.

The fourth handover request message includes parameters such as the first cell identifier and the network identifier in the third handover request message.

S815: The second CU-CP entity determines an EGW serving the first cell, where it is assumed that the EGW is a second EGW herein.

Optionally, in this embodiment of this application, the second CU-CP entity may select, based on information such as the first cell identifier, the EGW serving the first cell. This is not specifically limited herein.

S816: The second CU-CP entity initiates session resource setup to the second EGW, so that the second EGW allocates downlink routing information, and sends the downlink routing information to the second CU-CP entity. The second CU-CP entity receives the downlink routing information from the second EGW.

The downlink routing information is used to indicate transmission of downlink data from a first user plane entity in the first private network to a second user plane entity in the second private network. The first user plane entity herein may correspond to the first EGW in FIG. 3, and the second user plane entity herein may correspond to the second EGW in FIG. 3.

Optionally, the downlink routing information in this embodiment of this application may include a MAC address or an IP address of the second EGW. This is not specifically limited herein.

S817: After completing session resource setup configuration with the second EGW, the second CU-CP entity determines a DU entity serving the first cell, where it is assumed that the DU entity is a second DU entity herein.

S818: The second CU-CP entity and the second DU entity complete DU resource setup.

S819: After completing the resource setup of the second EGW and the second DU entity, the second CU-CP entity sends a fourth handover request acknowledgment (HO request ack) message to the second DCF network element. The first DCF network element receives the fourth handover request acknowledgment message from the second CU-CP entity.

The fourth handover request acknowledgment message includes the downlink routing information allocated by the second EGW.

S820: The second DCF network element sends a third handover request acknowledgment message to the first AMF network element. The first AMF network element receives the third handover request acknowledgment message from the second DCF network element.

The third handover request acknowledgment message includes the downlink routing information allocated by the second EGW.

S821: The first AMF network element sends a second handover request acknowledgment message to the first DCF network element. The first DCF network element receives the second handover request acknowledgment message from the first AMF network element.

The second handover request acknowledgment message includes the downlink routing information allocated by the second EGW.

Optionally, the second handover request acknowledgment message may further include parameter information such as a packet filter. This is not specifically limited herein.

S822: The first DCF network element sends a handover command (HO command) message to the first CU-CP entity. The first CU-CP entity receives the handover command message from the first DCF network element.

The handover command message includes the downlink routing information allocated by the second EGW. The handover command message is used to acknowledge that handover processing has been performed.

S823: The first CU-CP entity sends the handover command message to the first EGW. The first EGW receives the handover command message from the first CU-CP entity.

The handover command message includes the downlink routing information allocated by the second EGW. The handover command message is used to acknowledge that handover processing has been performed.

In this way, when receiving the downlink data, the first EGW may send the downlink data to the second EGW based on the downlink data routing information, so as to maintain service continuity.

S824: The first CU-CP entity sends the handover command message to the terminal device by using a first DU entity. The terminal device receives the handover command message from the first CU-CP entity by using the first DU entity.

The handover command message includes the downlink routing information allocated by the second EGW. The handover command message is used to acknowledge that handover processing has been performed.

S825: After receiving the handover command message, the terminal device acknowledges that the handover is completed, and sends a handover command acknowledgment (HO command ack) message to the second CU-CP entity by using a second DU entity. The second CU-CP entity receives the handover command acknowledgment message from the terminal device by using the second DU entity.

Based on the communication method provided in this embodiment of this application, in this solution, after moving out of coverage of the first private network, the terminal device may select the second private network, and the second EGW in the second private network may allocate downlink routing information, and sends the downlink routing information to the first EGW in the first private network, where the downlink routing information is used to indicate transmission of downlink data from the first EGW in the first private network to the second EGW in the second private network. In this way, when receiving the downlink data, the first EGW may send the downlink data to the second EGW based on the downlink data routing information, so as to maintain service continuity.

The actions of the first AMF network element or the actions of the first DCF network element in steps S801 to S825 may be performed by the processor 701 in the communication device 700 shown in FIG. 7 by invoking the application program code stored in the memory 703. This is not limited in this embodiment.

Figure 9A:
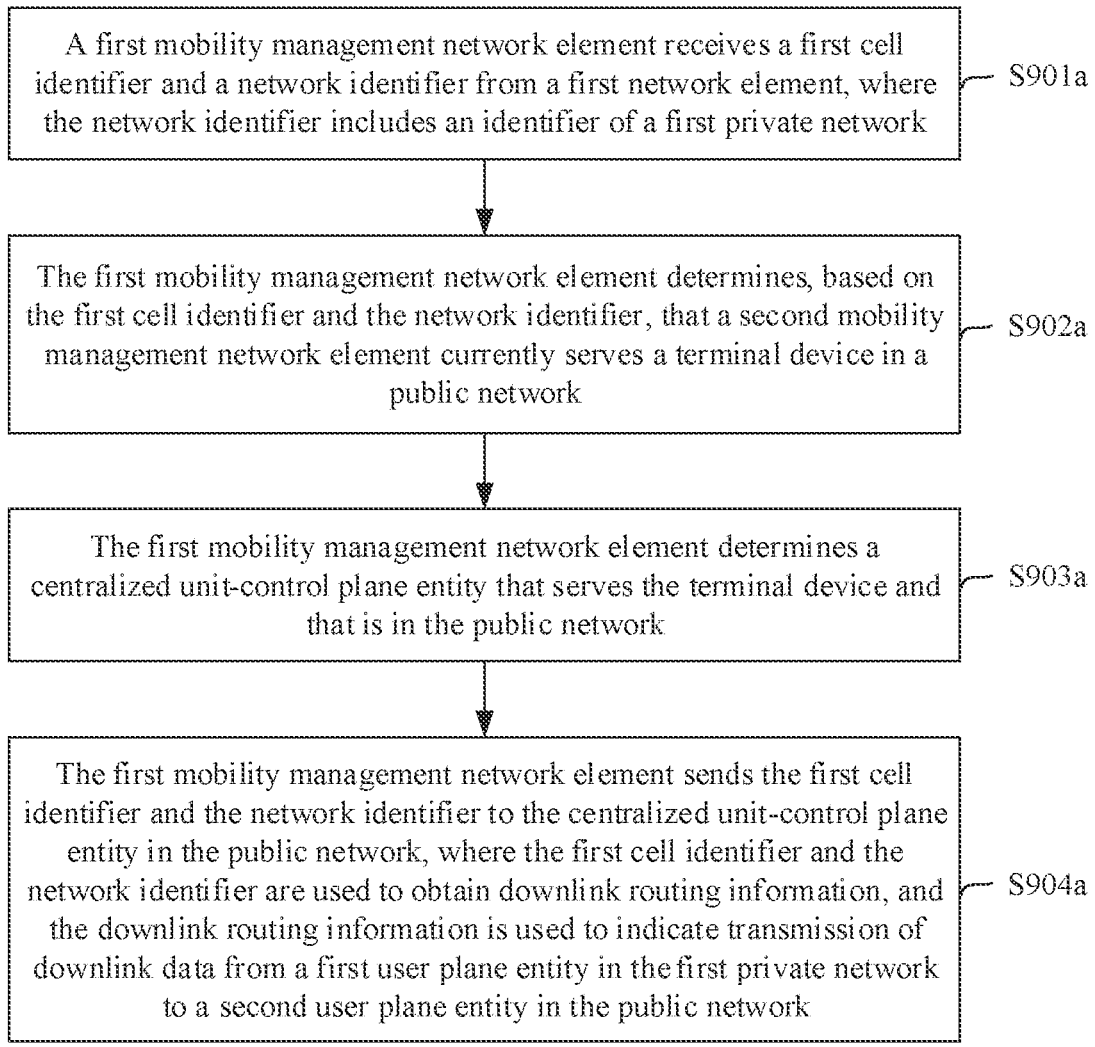
FIG. 9*a* is a schematic flowchart 2 of a communication method according to an embodiment of this application.
Figures 2, 9B:
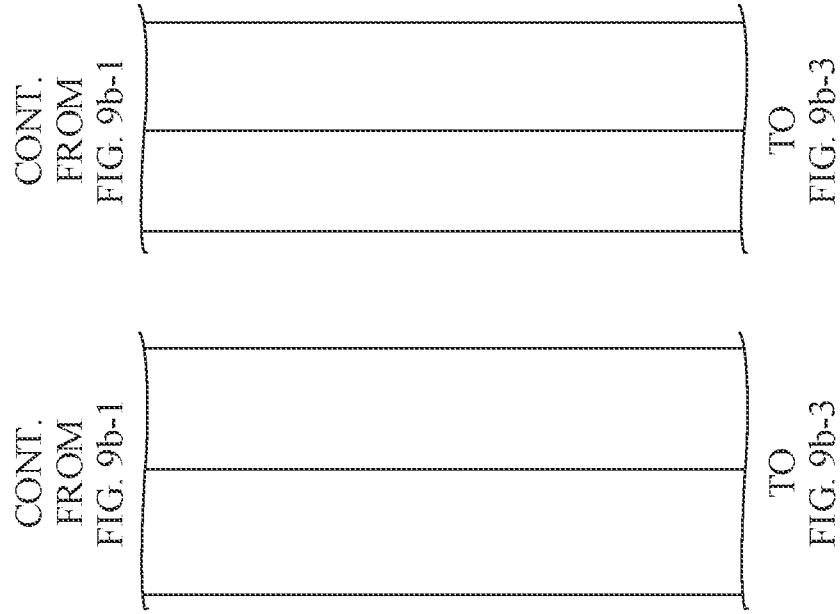
Figures 3, 9B:
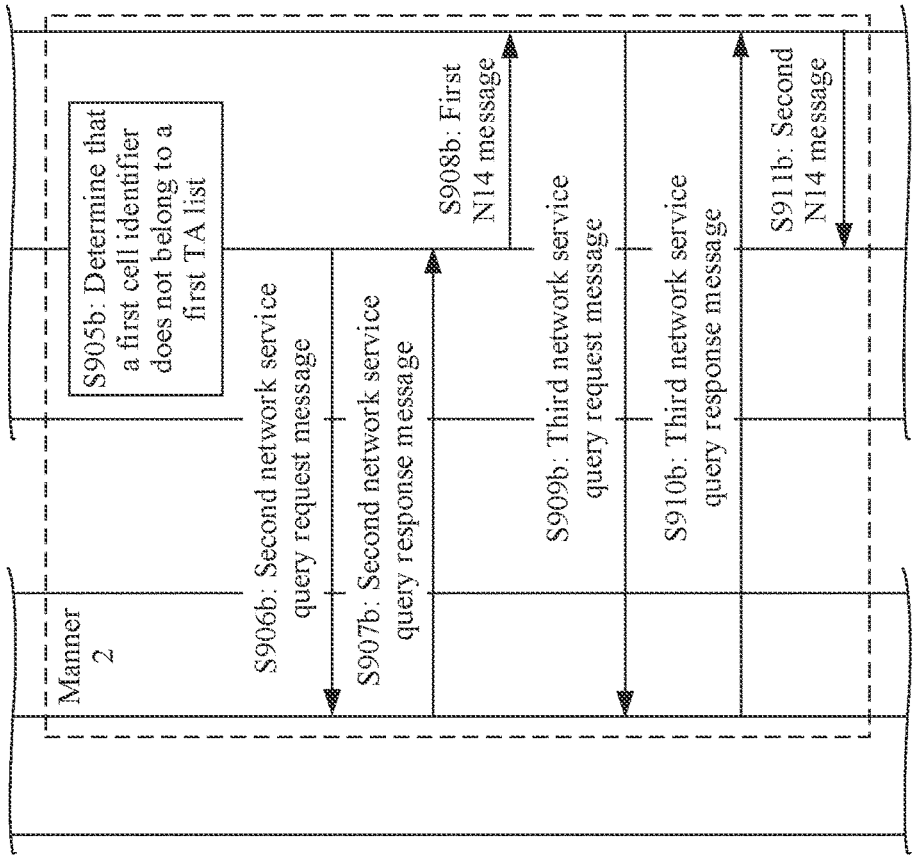
Figures 5, 9B:
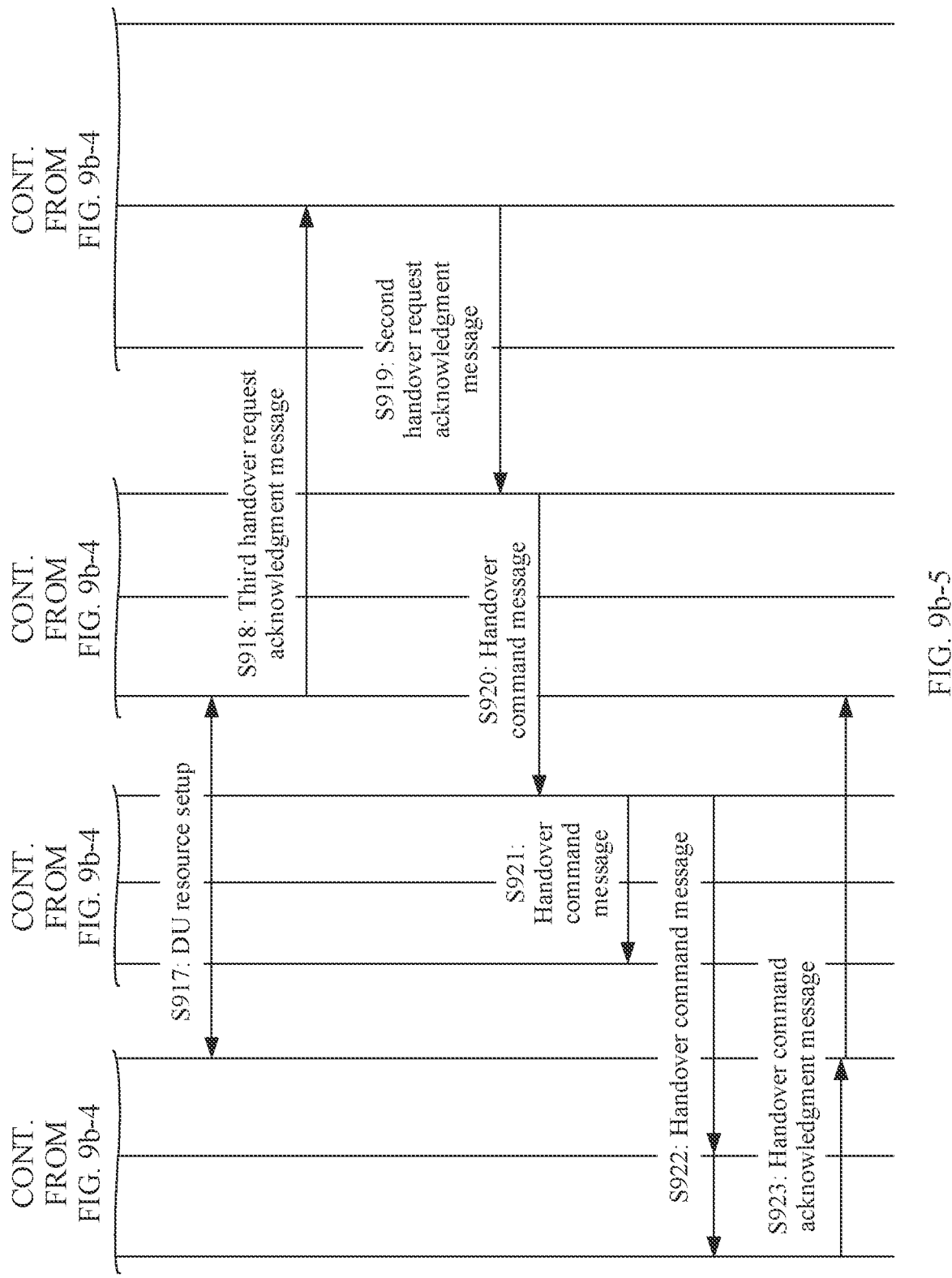

It is assumed that after the terminal device moves from a private network in a type A mode to a target area, no private network that can be accessed by the terminal device is deployed in the target area, that is, the terminal device moves from a coverage area of the first private network to a coverage area of a public network (the scenario shown in FIG. 6). FIG. 9a shows a communication method according to an embodiment of this application. The communication method includes the following steps S901a to S904a.

S901a: A first mobility management network element receives a first cell identifier and a network identifier from a first network element, where the network identifier includes an identifier of a first private network, and the first network element serves a terminal device in the first private network.

S902a: The first mobility management network element determines, based on the first cell identifier and the network identifier, that a second mobility management network element currently serves the terminal device in a public network.

S903a: The first mobility management network element determines a centralized unit-control plane entity that serves the terminal device and that is in the public network.

S904a: The first mobility management network element sends the first cell identifier and the network identifier to the centralized unit-control plane entity in the public network, where the first cell identifier and the network identifier are used to obtain downlink routing information, and the downlink routing information is used to indicate transmission of downlink data from a first user plane entity in the first private network to a second user plane entity in the public network.

Based on the communication system, after the terminal device moves out of coverage of the first private network, the terminal device can be handed over to a target cell, and service continuity can be ensured. Specific implementation of this solution is described in detail by using an interaction procedure between network elements shown in FIG. 9b-1, FIG. 9b-2, FIG. 9b-3, FIG. 9b-4, and FIG. 9b-5, and details are not described herein again.

For example, a public network is a 5G network, the first mobility management network element is a first AMF network element, the second mobility management network element is a second AMF network element, the first network element is the first DCF network element in FIG. 6, the centralized unit-control plane entity is the second CU-CP entity in FIG. 6, the first user plane entity is the first EGW in FIG. 6, and the second user plane entity is the CU-UP entity in FIG. 6. FIG. 9b-1, FIG. 9b-2, FIG. 9b-3, FIG. 9b-4, and FIG. 9b-5 show another communication method according to an embodiment of this application. The communication method includes the following steps.

S901 to S904: Same as steps S801 to S804 in the embodiment shown in FIG. 8b-1, FIG. 8b-2, FIG. 8b-3, FIG. 8b-4, and FIG. 8b-5. For related descriptions, refer to the embodiment shown in FIG. 8b-1, FIG. 8b-2, FIG. 8b-3, FIG. 8b-4, and FIG. 8b-5. Details are not described herein again.

After obtaining the first cell identifier and the network identifier, the first AMF network element may determine, based on the first cell identifier and the network identifier, whether a DCF network element is deployed in a first cell identified by the first cell identifier. Two implementations are provided as examples below.

In a possible implementation, as shown in FIG. 9b-1, FIG. 9b-2, FIG. 9b-3, FIG. 9b-4, and FIG. 9b-5, the communication method further includes the following steps S905a to S907a.

S905a and S906a: Same as steps S805a and S806a in the embodiment shown in FIG. 8b-1, FIG. 8b-2, FIG. 8b-3, FIG. 8b-4, and FIG. 8b-5. For related descriptions, refer to the embodiment shown in FIG. 8b-1, FIG. 8b-2, FIG. 8b-3, FIG. 8b-4, and FIG. 8b-5. Details are not described herein again.

S907a: An NRF network element determines that a DCF network element is deployed in the first cell identified by the first cell identifier, but the DCF network element does not support any private network that can be accessed by a terminal device; or an NRF network element determines that no DCF network element is deployed in the first cell identified by the first cell identifier.

For example, the NRF network element determines whether the DCF network element is deployed in the first cell identified by the first cell identifier, and determines, based on the network identifier, whether the deployed DCF network element supports the private network that can be accessed by the terminal device. If the NRF network element determines that the DCF network element is deployed in the first cell identified by the first cell identifier, but the DCF network element does not support any private network that can be accessed by the terminal device; or if the NRF network element determines that no DCF network element is deployed in the first cell identified by the first cell identifier, the NRF network element sends a first network service query response message to the first AMF network element. The first AMF network element receives the first network service query response message from the NRF network element. The first network service query response message does not include information about the DCF network element.

Certainly, if the NRF network element determines that a DCF network element is deployed in the first cell identified by the first cell identifier, and determines, based on the network identifier, that the deployed DCF network element supports the private network that can be accessed by the terminal device, the NRF network element continues to perform a related procedure in the embodiment shown in FIG. 8b-1, FIG. 8b-2, FIG. 8b-3, FIG. 8b-4, and FIG. 8b-5. Details are not described herein again.

Optionally, the first network service query response message in this embodiment of this application may alternatively be replaced with a first NF service response message. This is not specifically limited herein.

Alternatively, in another possible implementation, as shown in FIG. 8b-1, FIG. 8b-2, FIG. 8b-3, FIG. 8b-4, and FIG. 8b-5, the communication method further includes the following steps S905b to S911b.

S905b to S909b: Same as steps S805b to S809b in the embodiment shown in FIG. 8b-1, FIG. 8b-2, FIG. 8b-3, FIG. 8b-4, and FIG. 8b-5. For related descriptions, refer to the embodiment shown in FIG. 8b-1, FIG. 8b-2, FIG. 8b-3, FIG. 8b-4, and FIG. 8b-5. Details are not described herein again.

S910b: An NRF network element determines that a DCF network element is deployed in the first cell identified by the first cell identifier, but the DCF network element does not support any private network that can be accessed by a terminal device; or an NRF network element determines that no DCF network element is deployed in the first cell identified by the first cell identifier.

For example, the NRF network element determines whether the DCF network element is deployed in the first cell identified by the first cell identifier, and determines, based on the network identifier, whether the deployed DCF network element supports the private network that can be accessed by the terminal device. If the NRF network element determines that the DCF network element is deployed in the first cell identified by the first cell identifier, but the DCF network element does not support any private network that can be accessed by the terminal device; or if the NRF network element determines that no DCF network element is deployed in the first cell identified by the first cell identifier, the NRF network element sends a third network service query response message to a second AMF network element. The second AMF network element receives the third network service query response message from the NRF network element. The third network service query response message does not include information about the DCF network element.

Certainly, if the NRF network element determines that the DCF network element is deployed in the first cell identified by the first cell identifier, and determines, based on the network identifier, that the deployed DCF network element supports the private network that can be accessed by the terminal device, the NRF network element continues to perform a related procedure in the embodiment shown in FIG. 8b-1, FIG. 8b-2, FIG. 8b-3, FIG. 8b-4, and FIG. 8b-5. Details are not described herein again.

S911b: The second AMF network element sends a second N14 message to the first AMF network element. The first AMF network element receives the second N14 message from the second AMF network element.

The second N14 message does not include the information about the DCF network element.

Further, in this embodiment of this application, because the AMF 1 network element does not obtain the information about the DCF network element, it may be determined that the first AMF network element (corresponding to a case in which the first cell identifier belongs to a first TA list allocated by the first AMF network element to the terminal device) or the second AMF network element (corresponding to a case in which the first cell identifier does not belong to a first TA list allocated by the first AMF network element to the terminal device) currently serves the terminal device. Further, the communication method provided in this embodiment of this application may include the following steps.

S912: The first AMF network element determines a CU-CP entity serving the first cell, where it is assumed that the CU-CP entity is a second CU-CP entity herein.

Optionally, in this embodiment of this application, the first AMF network element may determine the CU-CP entity serving the first cell based on information such as the first cell identifier, a RAT type (that is, a current access standard of the terminal device), or PLMN information.

S913: The first AMF network element sends a third handover request message to the second CU-CP entity. The second CU-CP entity receives the third handover request message from the first AMF network element.

The third handover request message includes parameters such as the first cell identifier and the network identifier in the second handover request message.

S914: The second CU-CP entity determines a CU-UP entity serving the first cell.

Optionally, in this embodiment of this application, the second CU-CP entity may select, based on information such as the first cell identifier, the CU-UP entity serving the first cell. This is not specifically limited herein.

S915: The second CU-CP entity initiates session resource setup to the CU-UP entity, so that the CU-UP entity allocates downlink routing information, and sends the downlink routing information to the second CU-CP entity. The second CU-CP entity receives the downlink routing information from the CU-UP entity.

The downlink routing information is used to indicate transmission of downlink data from a first user plane entity in a first private network to a second user plane entity in a second private network. The first user plane entity herein may correspond to the first EGW in FIG. 6, and the second user plane entity herein may correspond to the CU-UP entity in FIG. 6.

Optionally, the downlink routing information in this embodiment of this application may include a MAC address or an IP address of the CU-UP entity. This is not specifically limited herein.

S916: After completing session resource setup configuration with the CU-UP entity, the second CU-CP entity determines a DU entity serving the first cell, where it is assumed that the DU entity is a second DU entity herein.

S917: The second CU-CP entity and the second DU entity complete DU resource setup.

S918: After completing the resource setup of the CU-UP entity and the second DU entity, the second CU-CP entity sends a third handover request acknowledgment message to the first AMF network element. The first AMF network element receives the third handover request acknowledgment message from the second CU-CP entity.

The third handover request acknowledgment message includes the downlink routing information allocated by the CU-UP entity.

S919: The first AMF network element sends a second handover request acknowledgment message to the first DCF network element. The first DCF network element receives the second handover request acknowledgment message from the first AMF network element.

The second handover request acknowledgment message includes the downlink routing information allocated by the CU-UP entity.

Optionally, the second handover request acknowledgment message may further include parameter information such as a packet filter. This is not specifically limited herein.

S920: The first DCF network element sends a handover command message to a first CU-CP entity. The first CU-CP entity receives the handover command message from the first DCF network element.

The handover command message includes the downlink routing information allocated by a second EGW. The handover command message is used to acknowledge that handover processing has been performed.

S921: The first CU-CP entity sends the handover command message to a first EGW. The first EGW receives the handover command message from the first CU-CP entity.

The handover command message includes the downlink routing information allocated by the CU-UP entity. The handover command message is used to acknowledge that handover processing has been performed.

In this way, when receiving the downlink data, the first EGW may send the downlink data to the CU-UP entity based on the downlink data routing information, so as to maintain service continuity.

S922: The first CU-CP entity sends the handover command message to the terminal device by using a first DU entity. The terminal device receives the handover command message from the first CU-CP entity by using the first DU entity.

The handover command message includes the downlink routing information allocated by the CU-UP entity. The handover command message is used to acknowledge that handover processing has been performed.

S923: After receiving the handover command message, the terminal device acknowledges that the handover is completed, and sends a handover command acknowledgment message to the second CU-CP entity by using a second DU entity. The second CU-CP entity receives the handover command acknowledgment message from the terminal device by using the second DU entity.

Based on the communication method provided in this embodiment of this application, in this solution, after moving out of coverage of the first private network, the terminal device may select a public network, and the CU-UP entity in the public network may allocate downlink routing information, and sends the downlink routing information to the first EGW in the first private network, where the downlink routing information is used to indicate transmission of downlink data from the first EGW in the first private network to the CU-UP entity in the public network. In this way, when receiving the downlink data, the first EGW may send the downlink data to the CU-UP entity based on the downlink data routing information, so as to maintain service continuity.

The actions of the first AMF network element or the actions of the first DCF network element in steps S901 to S923 may be performed by the processor 701 in the communication device 700 shown in FIG. 7 by invoking the application program code stored in the memory 703. This is not limited in this embodiment.

Figure 10:
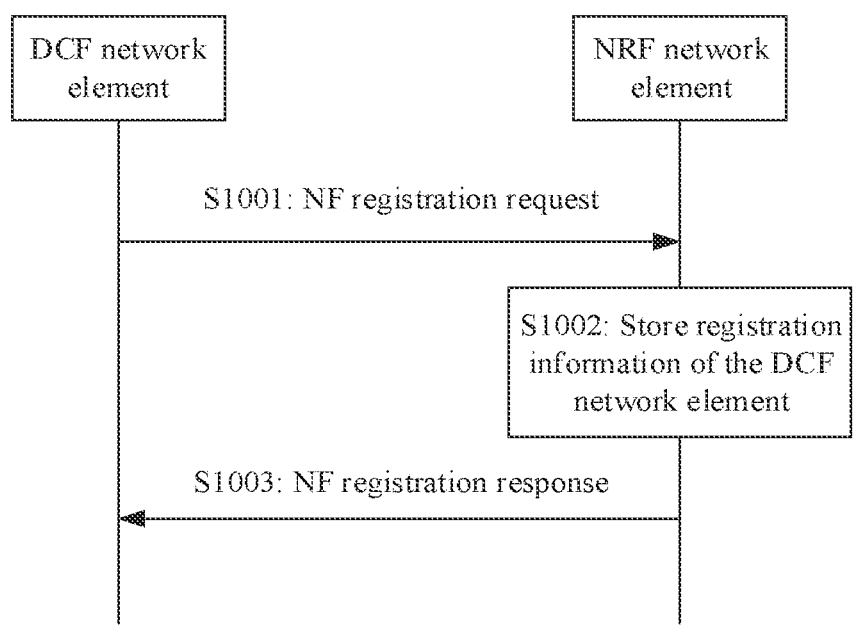
FIG. 10 is a schematic flowchart of registering a DCF network element with an NRF network element according to an embodiment of this application.

In this embodiment of this application, before mobility handover occurs on the terminal device, after a DCF network element in a network is deployed and goes online, the DCF network element needs to perform service registration with the NRF network element and send related attribute information (for example, a service area, an identifier, or a name of the DCF network element) of the DCF network element to the NRF network element for registration and storage, and then in another subsequent service processing procedure, another NF in the network may obtain information about the DCF network element by querying the NRF network element. In the embodiment shown in FIG. 8b-1, FIG. 8b-2, FIG. 8b-3, FIG. 8b-4, and FIG. 8b-5 or FIG. 9b-1, FIG. 9b-2, FIG. 9b-3, FIG. 9b-4, and FIG. 9b-5, the first AMF network element or the second AMF network element may query the information about the DCF network element from the NRF network element. For example, FIG. 10 is a schematic flowchart of registering a DCF network element with an NRF network element according to an embodiment of this application. The procedure includes the following steps.

S1001: After being deploying and going online, a DCF network element sends an NF registration request to an NRF network element. The NRF network element receives the NF registration request from the DCF network element.

The NF registration request includes information such as an identifier of the DCF network element (for example, a name of the DCF network element), an identifier of a cell served by the DCF network element, and a network identifier. The network identifier is used to identify a type of a network in which the DCF network element is located, for example, a private network in a type A mode, or a private network enterprise, such as an enterprise network A, to which the DCF network element belongs. A specific form is not limited in this embodiment of this application.

S1002: The NRF network element stores registration information of the DCF network element, so that another NF queries and invokes a service of the DCF network element subsequently.

S1003: After completing information registration management of the DCF network element, the NRF network element sends an NF registration response to the DCF network element. The DCF network element receives the NF registration response from the NRF network element.

The NF registration response is used to acknowledge that service registration of the DCF network element is completed.

Based on this solution, registration of network attribute information of the DCF network element may be implemented, so that in a subsequent service processing process, another NF can accurately obtain the attribute information of the DCF network element, thereby ensuring normal running of a service.

The actions of the DCF network element in steps S1001 to S1003 may be performed by the processor 701 in the communication device 700 shown in FIG. 7 by invoking the application program code stored in the memory 703. This is not limited in this embodiment.

Figure 11:
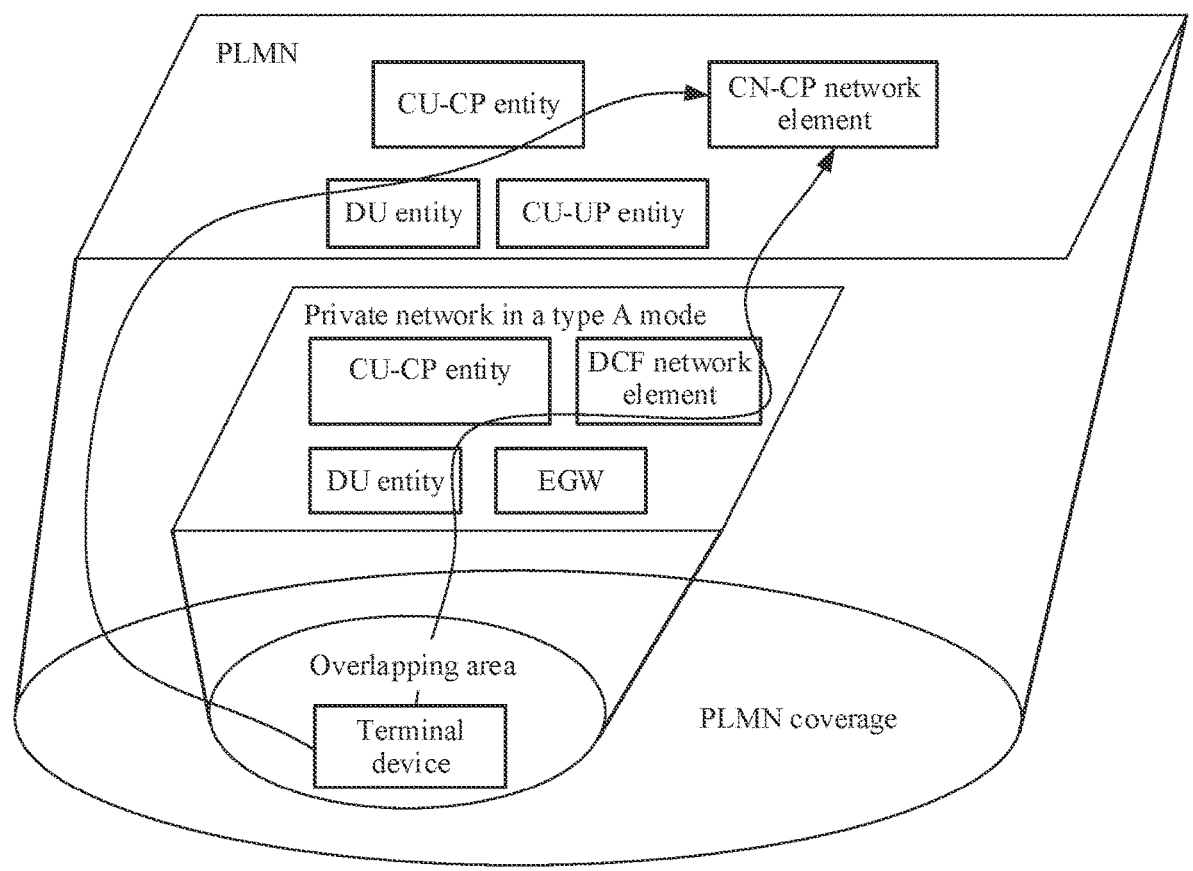
FIG. 11 is a schematic diagram of a registration solution according to an embodiment of this application.

In this embodiment of this application, before mobility handover is performed on the terminal device, the terminal device needs to perform registration. According to a definition of a private network in a type A mode in a conventional technology, although the private network in the type A mode provides only a private network service, a terminal device in the private network in the type A mode also needs a public network to provide a network service for the terminal device, so as to ensure service continuity. Therefore, to obtain the service of the private network in the type A mode and the service of the public network, the terminal device needs to register with both the private network in the type A mode and the public network. Based on the private network deployment scenario shown in FIG. 2, an embodiment of this application may provide two terminal device registration methods. In a solution, a terminal device performs registration by using a DU entity, a CU-CP entity, and a DCF network element in a private network; in another solution, a terminal device performs registration by using a DU entity and a CU-CP entity in a public network, as shown in FIG. 11. The following describes in detail the two registration solutions of the terminal device.

Figure 12:
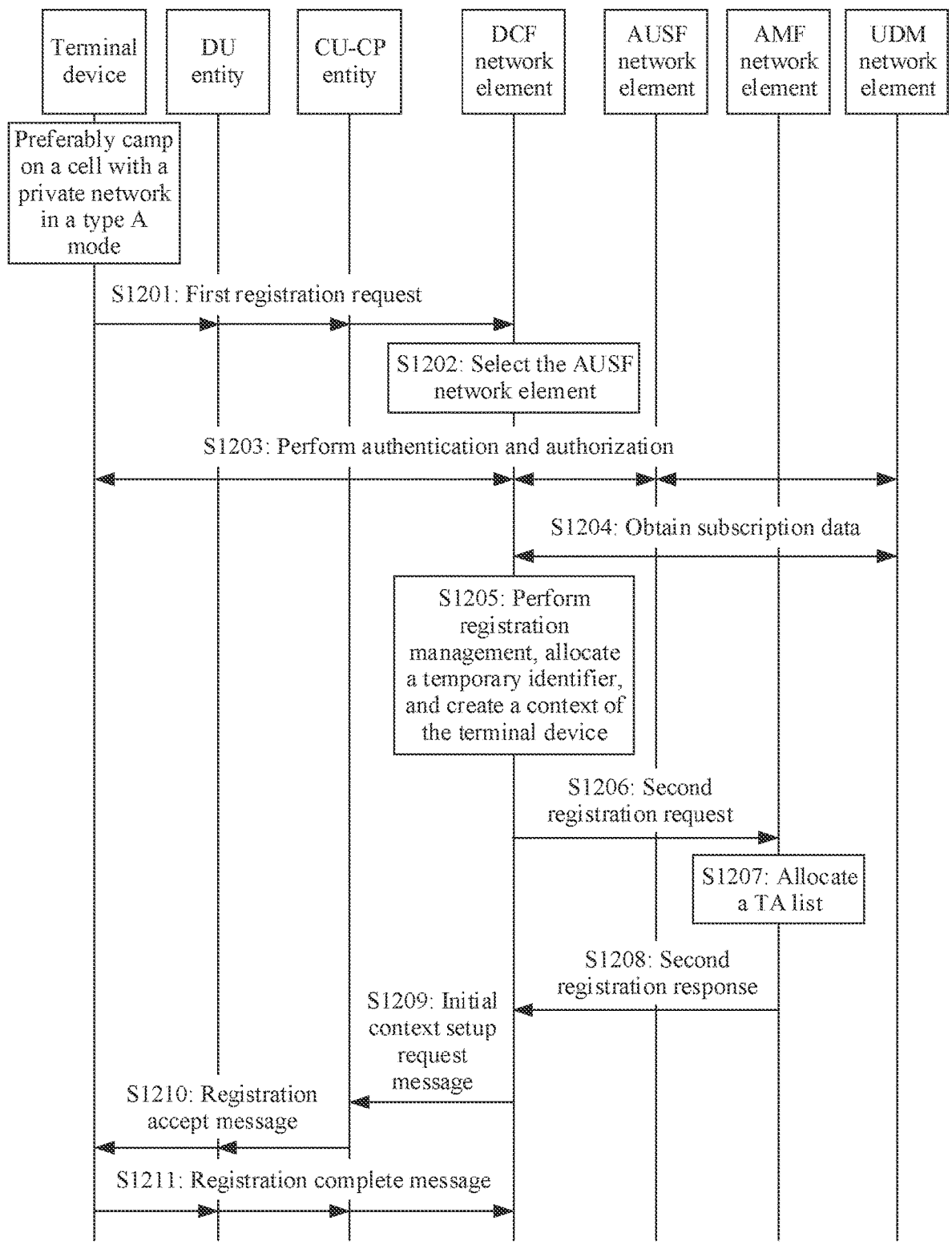
FIG. 12 is a schematic flowchart 1 of a registration method according to an embodiment of this application.

In a possible implementation, the terminal device is located in a coverage area of a private network in a type A mode, the terminal device registers with a DCF network element in the private network by using the private network in the type A mode, and the DCF network element obtains information about a network that the terminal device allows to be accessed, and determines, based on the information, whether to perform registration on a CN-CP in the public network (for example, a PLMN). In this solution, a cell selection policy of the terminal device needs to be modified. In other words, the terminal device selects a cell, and preferably selects a cell with a private network, for example, a cell with the private network in the type A mode, to ensure that the terminal device can directly access a private network that can be accessed by the terminal device. Specifically, when performing cell selection, the terminal device may preferably select, based on a received system information block (SIB) message (where the SIB message includes a network identifier of the private network in the type A mode) and a list of accessible network identifiers (stored in a subscriber identity module (SIM) card), the cell with the private network in the type A mode to camp on, and complete RRC connection setup. After the RRC connection is established, for example, FIG. 12 is a schematic flowchart of terminal device registration according to an embodiment of this application. The procedure includes the following steps.

S1201: A terminal device sends a first registration request to a DCF network element in a private network by using a DU entity and a CU-CP in the private network. The DCF network element receives the first registration request from the terminal device.

The first registration request includes information such as a PDU registration, a cell identifier (denoted as a second cell identifier herein) of a cell in which the terminal device is currently located, and a RAT type.

It should be noted that the DU entity and the CU-CP entity in step S1201 are selected in an RRC connection setup procedure when the terminal device initially accesses a network, and radio resource connections have been set up between the terminal device and these network entities. Therefore, the terminal device may directly send the first registration request by using the established RRC connection. A general description is provided herein, and details are not described below.

S1202: The DCF network element selects an AUSF network element.

Optionally, in this embodiment of this application, the DCF network element may select the AUSF network element by querying an NRF. This is not specifically limited herein.

S1203: The DCF network element performs authentication and authentication with the terminal device and the AUSF network element, so that the terminal device sends a related security context to the DCF network element, and then the DCF network element may initiate an access stratum (AS) or NAS security procedure, to activate an AS or NAS security mechanism.

S1204: The DCF network element obtains access and mobility-related subscription data of the terminal device from a UDM network element.

Optionally, the subscription data may include subscription information such as an identifier of a private network that can be accessed by the terminal device.

S1205: If the subscription data includes the identifier of the private network that can be accessed by the terminal device, and the private network that can be accessed by the terminal device and with which the terminal device subscribes is deployed in an area in which the terminal device is located, the DCF network element performs location registration management of the terminal device, allocates a temporary identifier to the terminal device, and creates a context of the terminal device for the terminal device.

The context of the terminal device includes the second cell identifier, the temporary identifier allocated by the DCF network element to the terminal device, and the like.

S1206: The DCF network element may obtain, by querying the NRF network element, information about an AMF network element serving a current cell, and send a second registration request to the AMF network element. The AMF network element receives the second registration request from the DCF network element.

The second registration request includes the context of the terminal device. The second registration request is used to register related location information of the terminal device with the AMF network element.

S1207: The AMF network element manages a location of the terminal device, and allocates a TA list to the terminal device, where the TA list is used to identify a location area in which the terminal device registers.

In this embodiment of this application, the TA list includes one or more cell identifiers, and the one or more cell identifiers include the second cell identifier.

S1208: The AMF network element sends a second registration response to the DCF network element. The DCF network element receives the second registration response from the AMF network element.

The second registration response includes the TA list.

S1209: After completing related processing such as context creation of the terminal device, the DCF network element sends an initial context setup request (initiate UE context setup request) message to the CU-CP entity. The CU-CP entity receives the initial context setup request message from the DCF network element.

The initial context setup request message may include information such as a registration accept PDU, a 5G-GUTI, a handover restriction list (for example, a cell list or a PLMN list), a UE-aggregate maximum bit rate (AMBR), or an identifier of the DCF network element. The 5G-GUTI is a new identifier allocated by the DCF network element to the terminal device, and the identifier of the DCF network element is used to uniquely identify the DCF network element.

Optionally, the initial context setup request message may further include the TA list.

S1210: The CU-CP entity sends a registration accept message to the terminal device by using the DU entity. The terminal device receives the registration accept message from the CU-CP entity.

Optionally, the registration accept message includes one or more of the TA list, the 5G-GUTI, or the UE-AMBR. This is not specifically limited in this embodiment of this application.

S1211: The terminal device sends a registration complete message to the DCF network element by using the DU entity and the CU-CP entity. The DCF network element receives the registration complete message from the terminal device.

The registration complete message is used to indicate that registration is completed.

Based on this solution, the terminal device can directly access a network from a private network, and complete two-level hierarchical registration of the DCF network element and the AMF network element.

The actions of the DCF network element or the actions of the AMF network element in steps S1201 to S1211 may be performed by the processor 701 in the communication device 700 shown in FIG. 7 by invoking the application program code stored in the memory 703. This is not limited in this embodiment.

Figure 13:
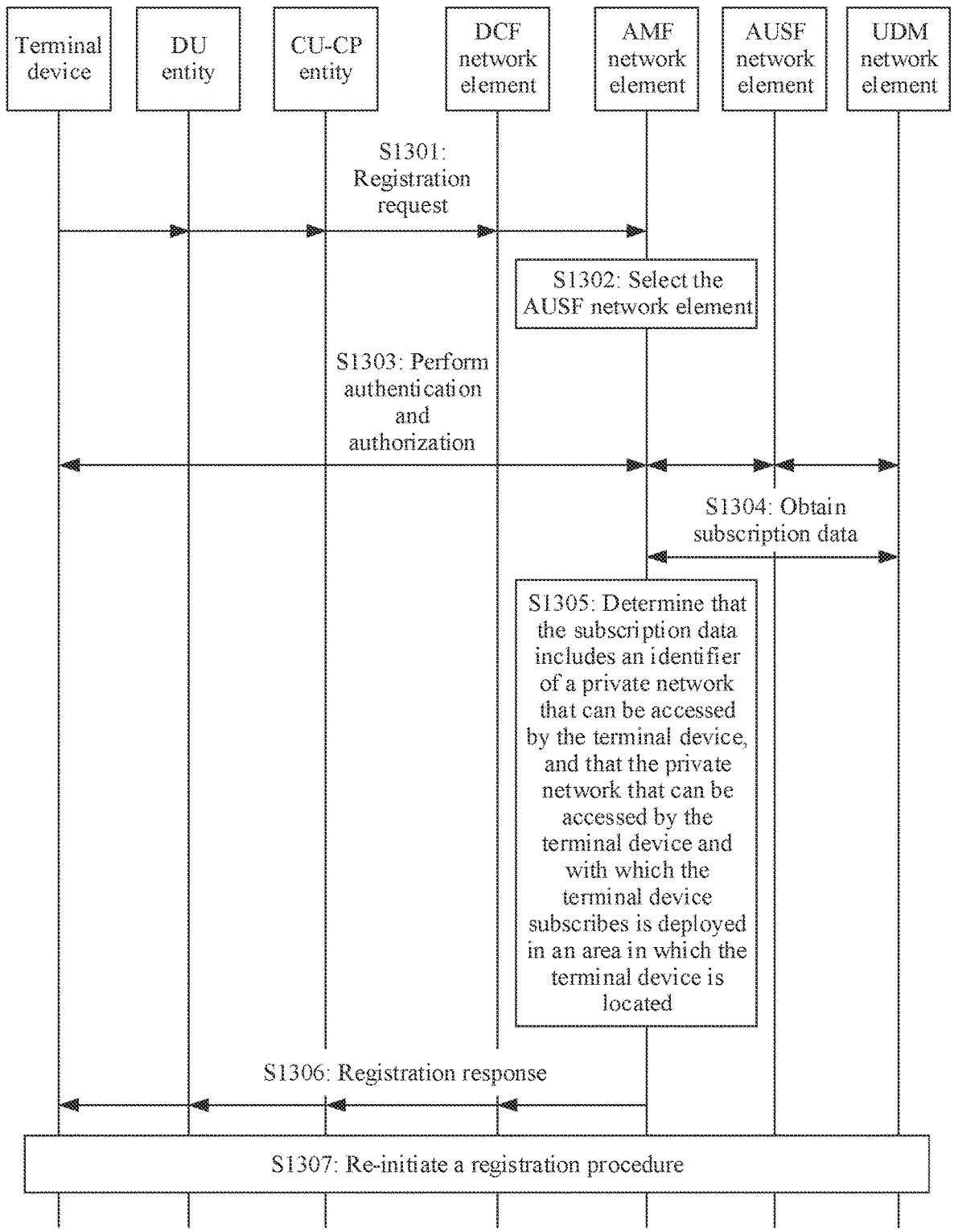
FIG. 13 is a schematic flowchart 2 of a registration method according to an embodiment of this application.

In another possible implementation, the terminal device is located in a coverage area of a private network in a type A mode, but selects a public network (for example, a PLMN network) for registration. In this case, the AMF network element rejects the registration request of the terminal device, and indicates the terminal device to perform cell selection again and initiate registration. For example, FIG. 13 is another schematic flowchart of terminal device registration according to an embodiment of this application. The procedure includes the following steps.

S1301: A terminal device sends a registration request to an AMF network element in a public network by using a DU entity and a CU-CP entity in the public network. The AMF network element receives the registration request from the terminal device.

The registration request includes information such as a PDU registration, a cell identifier (denoted as a second cell identifier herein) of a cell in which the terminal device is currently located, and a RAT type.

It should be noted that the DU entity and the CU-CP entity in step S1301 are selected in an RRC connection setup procedure when the terminal device initially accesses a network, and radio resource connections have been set up between the terminal device and these network entities. Therefore, the terminal device may directly send the registration request by using the established RRC connection. A general description is provided herein, and details are not described below.

S1302: The AMF network element selects an AUSF network element.

Optionally, in this embodiment of this application, the AMF network element may select the AUSF network element by querying an NRF. This is not specifically limited herein.

S1303: The AMF network element performs authentication and authentication with the terminal device and the AUSF network element, so that the terminal device sends a related security context to the AMF network element, and then the AMF network element may initiate an AS or NAS security procedure, to activate an AS or NAS security mechanism.

Optionally, in this embodiment of this application, if the terminal device has previously registered with the public network, the AMF network element may request, by using a context transfer message, to obtain the context of the terminal device from an old AMF network element. This is not specifically limited herein.

S1304: The AMF network element obtains access and mobility-related subscription data of the terminal device from a UDM network element.

Optionally, the subscription data may include subscription information such as an identifier of a private network that can be accessed by the terminal device.

S1305: The AMF network element determines that the subscription data includes the identifier of the private network that can be accessed by the terminal device, and the private network that can be accessed by the terminal device and with which the terminal device subscribes is deployed in an area in which the terminal device is located.

Optionally, in this embodiment of this application, if the AMF network element determines that the subscription data does not include the identifier of the private network that can be accessed by the terminal device; or if the AMF network element determines that the subscription data does not include the identifier of the private network that can be accessed by the terminal device, but the private network that can be accessed by the terminal device and with which the terminal device subscribes is not deployed in the area in which the terminal device is located, the AMF network element continues to perform subsequent steps in a terminal device registration procedure with reference to an existing registration procedure. Details are not described herein.

S1306: The AMF network element sends a registration response to the terminal device by using the CU-CP entity and the DU entity. The terminal device receives the registration response from the AMF network element.

The registration response includes registration rejection information. The registration rejection information is used to indicate the terminal device to register with the private network that can be accessed by the terminal device.

Optionally, in this embodiment of this application, the registration rejection message may include a registration cause value, and the registration cause value is re-attach, to indicate the terminal device to register with the private network that can be accessed by the terminal device.

S1307: The terminal device re-initiates a registration procedure. For details, refer to steps S1201 to S1211 in the embodiment shown in FIG. 12. Details are not described herein again.

Based on this solution, when the terminal device is located in an overlapping coverage area of a public network and the private network that can be accessed by the terminal device, the terminal device selects the public network to camp on, and initiates registration of the terminal device with the public network. In a subsequent re-registration procedure of the terminal device, the terminal device may register with the private network that can be accessed by the terminal device.

The actions of the DCF network element or the actions of the AMF network element in steps S1301 to S1307 may be performed by the processor 701 in the communication device 700 shown in FIG. 7 by invoking the application program code stored in the memory 703. This is not limited in this embodiment.

This embodiment of this application may further provide a paging processing procedure for a terminal device in an idle state. In the paging procedure, the DCF network element is responsible for initiating paging for the terminal device. If the DCF network element cannot page the terminal device in a service area of the DCF network element, the DCF network element further triggers a request for paging optimization processing from the AMF network element, for example, expanding a paging range. The following provides two implementations as examples.

Figure 14:
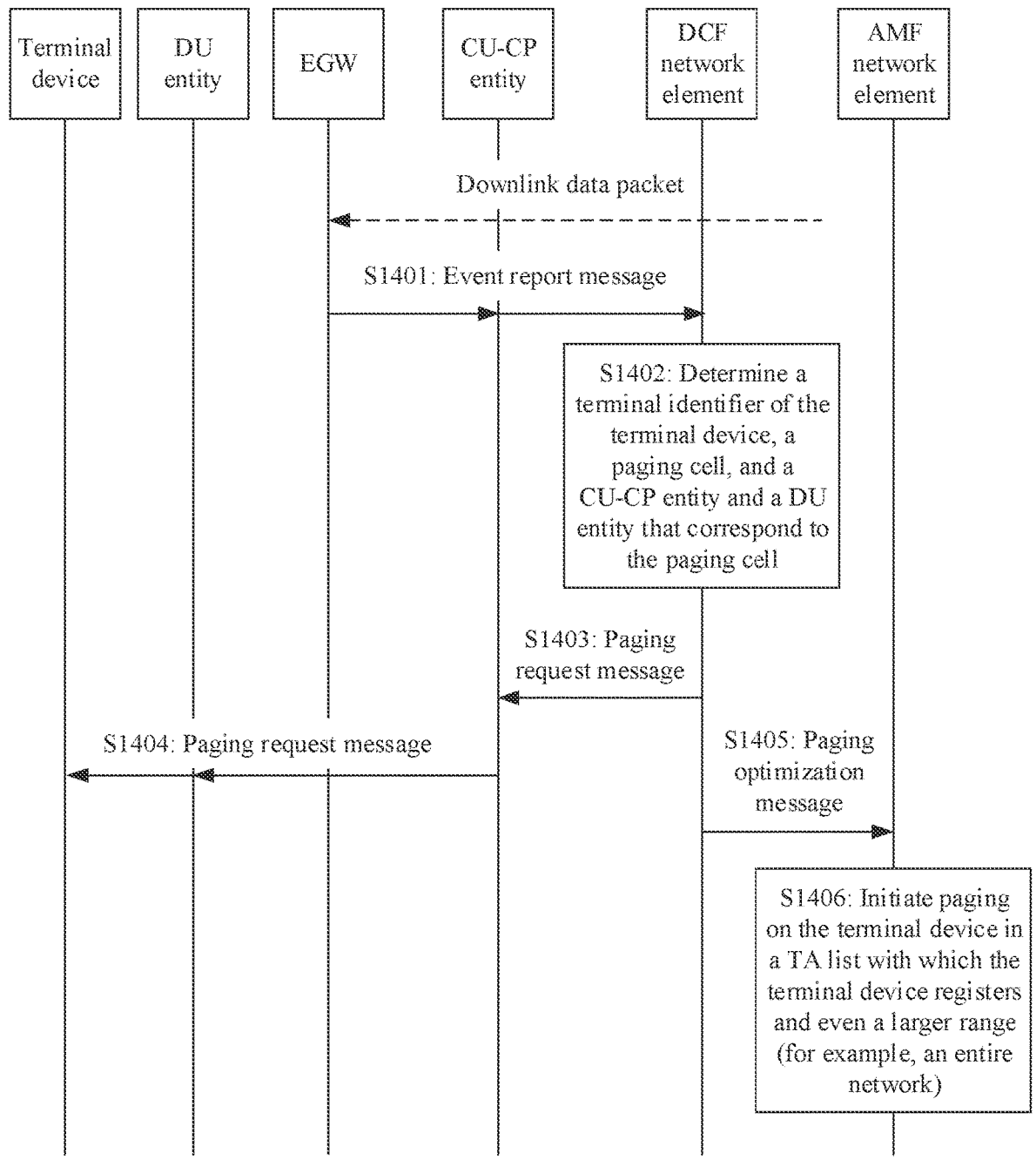
FIG. 14 is a schematic flowchart 1 of a paging method according to an embodiment of this application.

In a possible implementation, FIG. 14 shows a data-triggered paging method according to an embodiment of this application. The method includes the following steps.

S1401: When receiving a downlink data packet, an EGW parses the downlink data packet to obtain packet header information, and performs matching based on an IP 5-tuple in the packet header information and a packet filter installed on the EGW (namely, an SDAP function). Although the packet filter can be matched, if the EGW does not match a DRB, the EGW cannot send the downlink data packet to a terminal device by using the matched packet filter and a matched DRB. Therefore, the EGW buffers the received downlink data packet, and sends an event report message to a DCF network element by using a CU-CP entity, and the DCF network element receives the event report message from the EGW.

The event report message includes UE IP address information of a downlink data packet header.

Optionally, the event report message in this embodiment of this application may further include an IP 5-tuple. The IP 5-tuple includes a source IP address, a source port, a destination IP address, a destination port, and a protocol type.

S1402: The DCF network element determines, based on the UE IP address information in the downlink data packet header, a terminal identifier of the terminal device, a paging cell, and a CU-CP entity and a DU entity that correspond to the paging cell.

Optionally, in this embodiment of this application, after receiving the event report message from the EGW, the DCF network element may search for a locally stored context of the terminal device, to determine the identifier that is of the terminal device (for example, a 5G-GUTI or an S-TMSI) and that corresponds to the UE IP address information, the paging cell that corresponds to the UE IP address information, and the CU-CP entity and the DU entity that correspond to the paging cell and that correspond to the UE IP address information.

S1403: The DCF network element sends a paging request message to the corresponding CU-CP entity. The CU-CP entity receives the paging request message from the DCF network element.

The paging request message includes information such as the identifier of the terminal device and a paging area.

It should be noted that in this embodiment of this application, an example in which the CU-CP entity in step S1401 and the CU-CP entity determined in step S1402 are a same CU-CP entity is used for description. Certainly, the two CU-CP entities may alternatively be different CU-CP entities. This is not specifically limited in this embodiment of this application.

S1404: The CU-CP entity sends the paging request message to the terminal device by using the DU entity. The terminal device receives the paging request message from the CU-CP entity.

S1405: If the DCF network element does not receive a response (for example, a service request) from the terminal device for a plurality of times of paging or within specific time, the DCF network element sends a paging optimization request to the AMF network element. The AMF network element receives the paging optimization request from the DCF network element.

The paging optimization request is used to request the AMF network element to expand a paging range.

S1406: The AMF network element initiates paging to the terminal device in a TA list with which the terminal device registers or in an even larger range (for example, the entire network).

Based on this solution, the DCF network element may implement paging processing on a terminal device in an idle state, and a centralized AMF network element may perform paging processing on the terminal device in a larger range.

The actions of the DCF network element or the actions of the AMF network element in steps S1401 to S1406 may be performed by the processor 701 in the communication device 700 shown in FIG. 7 by invoking the application program code stored in the memory 703. This is not limited in this embodiment.

Figure 15:
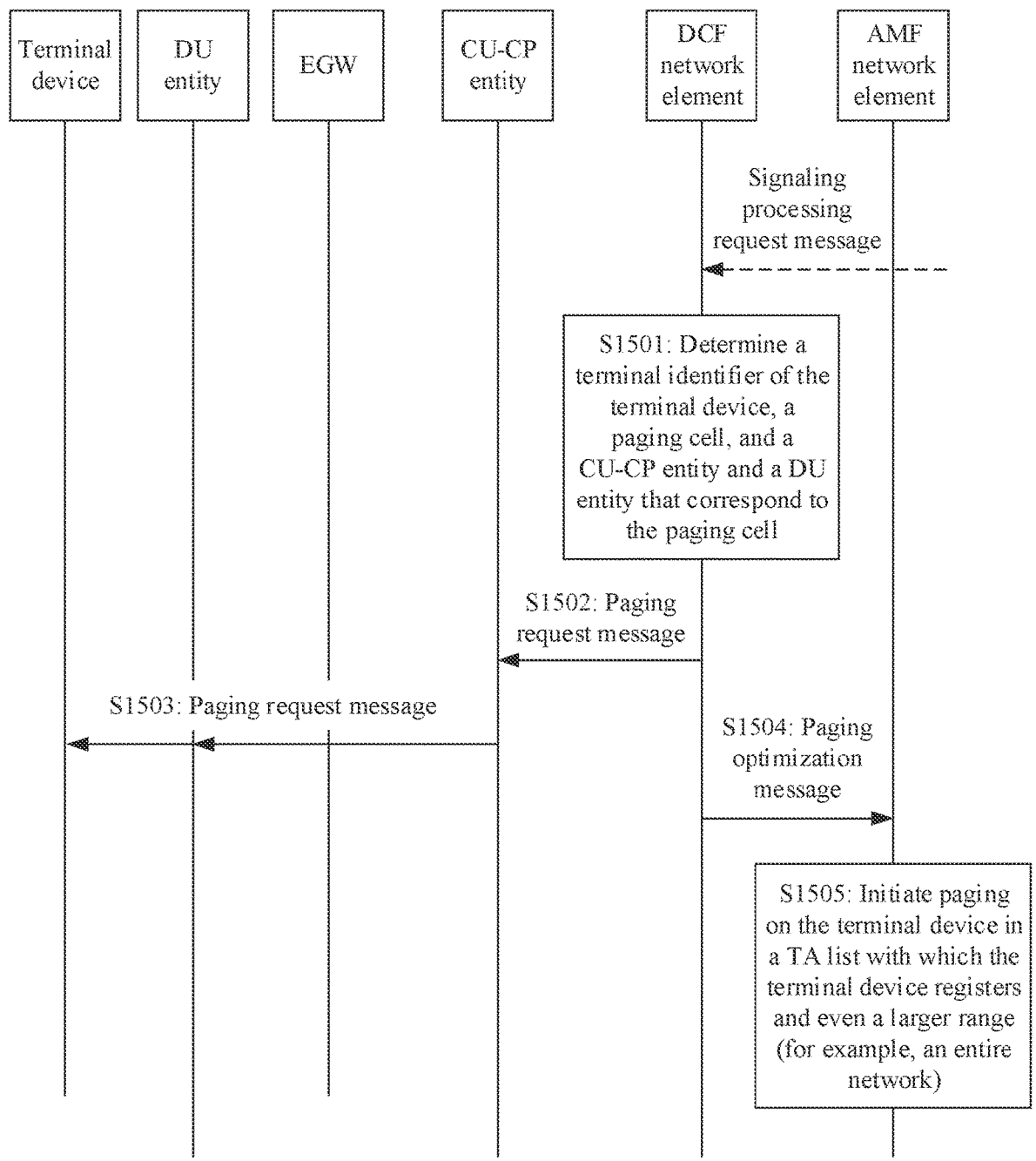
FIG. 15 is a schematic flowchart 2 of a paging method according to an embodiment of this application.

Alternatively, in another possible implementation, FIG. 15 shows a signaling-triggered paging method according to an embodiment of this application. The method includes the following steps.

S1501: When a DCF network element receives a signaling processing request message for a terminal device in an idle state, the DCF network element determines, based on the signaling processing request message, a terminal identifier of the terminal device, a paging cell, and a CU-CP entity and a DU entity that correspond to the paging cell.

S1502: The DCF network element sends a paging request message to the corresponding CU-CP entity. The CU-CP entity receives the paging request message from the DCF network element.

The paging message includes information such as the identifier of the terminal device and a paging area.

S1503 to S1505: Same as steps S1404 to S1406 in the embodiment shown in FIG. 14. For related descriptions, refer to the embodiment shown in FIG. 14. Details are not described herein again.

Based on this solution, the DCF network element may implement paging processing on a terminal device in an idle state, and a centralized AMF network element may perform paging processing on the terminal device in a larger range.

The actions of the DCF network element or the actions of the AMF network element in steps S1501 to S1505 may be performed by the processor 701 in the communication device 700 shown in FIG. 7 by invoking the application program code stored in the memory 703. This is not limited in this embodiment.

It may be understood that in the foregoing embodiments, methods and/or steps implemented by the first network element may alternatively be implemented by a component (for example, a chip or a circuit) that can be used in the first network element, and methods and/or steps implemented by the first mobility management network element may alternatively be implemented by a component that can be used in the first mobility management network element.

The foregoing mainly describes the solutions provided in some embodiments of this application from a perspective of interaction between network elements. Correspondingly, an embodiment of this application further provides a communication device, and the communication device is configured to implement the foregoing methods. The communication device may be the first network element in the foregoing method embodiments, an apparatus including the first network element, or a component that can be used in the first network element. Alternatively, the communication device may be the first mobility management network element in the foregoing method embodiments, an apparatus including the first mobility management network element, or a component that can be used in the first mobility management network element. It may be understood that, to implement the foregoing functions, the communication device includes a hardware structure and/or a software module for performing a corresponding function. A person skilled in the art should easily be aware that, in combination with units and algorithm steps of the examples described in some embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In some embodiments of this application, the communication device may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module. It should be noted that, in some embodiments of this application, module division is merely an example, and is merely a logical function division. In actual implementation, another division manner may be used.

Figure 16:
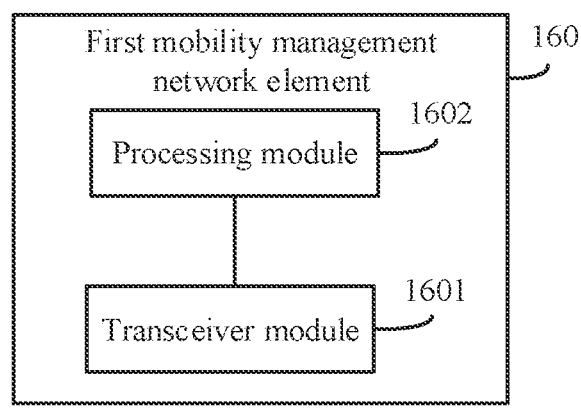
FIG. 16 is a schematic structural diagram of a first mobility management network element according to an embodiment of this application.

For example, the communication device is the first mobility management network element in the foregoing method embodiments. FIG. 16 is a schematic structural diagram of a first mobility management network element 160. The first mobility management network element 160 includes a transceiver module 1601 and a processing module 1602. The transceiver module 1601 may also be referred to as a transceiver unit, and is configured to implement a transceiver function. For example, the transceiver module 1601 may be a transceiver circuit, a transceiver machine, a transceiver, or a communication interface.

In a possible implementation, the transceiver module 1601 is configured to receive a first cell identifier and a network identifier from a first network element, where the network identifier includes an identifier of a first private network and an identifier of a second private network. The processing module 1602 is configured to obtain information about a second network element based on the first cell identifier and the network identifier, where the first network element serves a terminal device in the first private network, and the second network element serves the terminal device in the second private network. The transceiver module 1601 is further configured to send the first cell identifier and the network identifier to the second network element indicated by the information about the second network element, where the first cell identifier and the network identifier are used to obtain downlink routing information, and the downlink routing information is used to indicate transmission of downlink data from a first user plane entity in the first private network to a second user plane entity in the second private network.

Optionally, that the processing module 1602 is configured to obtain information about a second network element based on the first cell identifier and the network identifier includes: the processing module 1602 is configured to: determine that the first cell identifier belongs to a first TA list allocated by the first mobility management network element to the terminal device; send the first cell identifier and the network identifier to a network repository function network element by using the transceiver module 1601, where the first cell identifier and the network identifier are used to determine the information about the second network element; and receive the information about the second network element from the network repository function network element by using the transceiver module 1601.

Further, the transceiver module 1601 is further configured to receive a second cell identifier from the terminal device. The processing module 1602 is further configured to allocate the first TA list to the terminal device, where the first TA list includes the second cell identifier and the first cell identifier. The transceiver module 1601 is further configured to send the first TA list to the terminal device by using the first network element, where the first TA list is used to identify a location area in which the terminal device registers.

Optionally, that the processing module 1602 is configured to obtain information about a second network element based on the first cell identifier and the network identifier includes: the processing module 1602 is configured to: determine that the first cell identifier does not belong to a first TA list allocated by the first mobility management network element to the terminal device; send the first cell identifier to a network repository function network element by using the transceiver module 1601; receive information about a second mobility management network element from the network repository function network element by using the transceiver module 1601, where the second mobility management network element is a mobility management network element that can serve a cell corresponding to the first cell identifier; send, by using the transceiver module 1601, the first cell identifier and the network identifier to the second mobility management network element indicated by the second mobility management network element, where the first cell identifier and the network identifier are used to determine the information about the second network element; and receive the information about the second network element from the second mobility management network element by using the transceiver module 1601.

Further, the processing module 1602 is further configured to receive a second cell identifier from the terminal device. The processing module 1602 is further configured to allocate the first TA list to the terminal device, where the first TA list includes the second cell identifier. The transceiver module 1601 is further configured to send the first TA list to the terminal device by using the first network element, where the first TA list is used to identify a location area in which the terminal device registers.

Optionally, the transceiver module 1601 is further configured to receive the downlink routing information from the second network element, where the downlink routing information is allocated by the second user plane entity. The transceiver module 1601 is further configured to send the downlink routing information to the first user plane entity by using the first network element.

Optionally, the transceiver module 1601 is further configured to receive the second cell identifier from the terminal device. The transceiver module 1601 is further configured to receive the network identifier from a unified data management network element. The processing module 1602 is further configured to determine, based on the second cell identifier and the network identifier, that a private network that can be accessed by the terminal device is deployed in a cell identified by the second cell identifier. The transceiver module 1601 is further configured to send registration rejection information to the terminal device, where the registration rejection information is used to indicate the terminal device to register with the private network that can be accessed by the terminal device.

In another possible implementation, the transceiver module 1601 is configured to receive a first cell identifier and a network identifier from a first network element, where the network identifier includes an identifier of a first private network, and the first network element serves a terminal device in the first private network. The processing module 1602 is configured to determine, based on the first cell identifier and the network identifier, that a second mobility management network element currently serves the terminal device in a public network. The processing module 1602 is further configured to determine a centralized unit-control plane entity that serves the terminal device and that is in the public network. The transceiver module 1601 is further configured to send the first cell identifier and the network identifier to the centralized unit-control plane entity in the public network, where the first cell identifier and the network identifier are used to obtain downlink routing information, and the downlink routing information is used to indicate transmission of downlink data from a first user plane entity in the private network to a second user plane entity in the public network.

All related content of the steps in the foregoing method embodiments may be cited in function descriptions of corresponding function modules. Details are not described herein again.

In this embodiment, the first mobility management network element 160 is presented with the function modules divided through integration. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the first mobility management network element 160 may be in a form of the communication device 700 shown in FIG. 7.

For example, the processor 701 in the communication device 700 shown in FIG. 7 may invoke the computer-executable instructions stored in the memory 703, so that the communication device 700 performs the communication method in the foregoing method embodiments.

Specifically, functions/implementation processes of the transceiver module 1601 and the processing module 1602 in FIG. 16 may be implemented by the processor 701 in the communication device 700 shown in FIG. 7 by invoking the computer-executable instructions stored in the memory 703. Alternatively, a function/an implementation process of the processing module 1602 in FIG. 16 may be implemented by the processor 701 in the communication device 700 shown in FIG. 7 by invoking the computer-executable instructions stored in the memory 703, and a function/an implementation process of the transceiver module 1601 in FIG. 16 may be implemented by using the communication interface 704 in the communication device 700 shown in FIG. 7.

The first mobility management network element 160 provided in this embodiment can perform the foregoing communication method. Therefore, for a technical effect that can be achieved by the first mobility management network element 160, refer to the foregoing method embodiment. Details are not described herein again.

Figure 17:
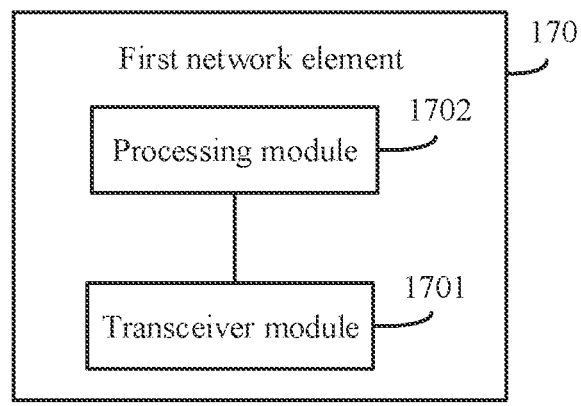
FIG. 17 is a schematic structural diagram of a first network element according to an embodiment of this application.

Alternatively, for example, the communication device is the first network element in the foregoing method embodiments. FIG. 17 is a schematic structural diagram of a first network element 170. The first network element 170 includes a transceiver module 1701 and a processing module 1702. The transceiver module 1701 may also be referred to as a transceiver unit, and is configured to implement a transceiver function. For example, the transceiver module 1701 may be a transceiver circuit, a transceiver machine, a transceiver, or a communication interface.

In a possible implementation, the processing module 1702 is configured to obtain a first cell identifier and a network identifier, where the network identifier includes an identifier of a first private network and an identifier of a second private network, and the first network element serves a terminal device in the first private network. The processing module 1702 is further configured to determine, based on the first cell identifier, that an area in which the terminal device is currently located is beyond a service range of a cell identified by the first cell identifier. The transceiver module 1701 is configured to send the first cell identifier and the network identifier to a first mobility management network element, where the first cell identifier and the network identifier are used to obtain downlink routing information, and the downlink routing information is used to indicate transmission of downlink data from a first user plane entity in the first private network to a second user plane entity in the second private network.

Optionally, the transceiver module 1701 is further configured to receive the downlink routing information from the first mobility management network element, where the downlink routing information is allocated by the second user plane entity. The transceiver module 1701 is further configured to send the downlink routing information to the first user plane entity.

Optionally, the transceiver module 1701 is further configured to receive a second cell identifier from the terminal device. The transceiver module 1701 is further configured to send the second cell identifier to the first mobility management network element. The transceiver module 1701 is further configured to receive, from the first mobility management network element, a first TA list allocated by the first mobility management network element to the terminal device, where the first TA list includes the second cell identifier and the first cell identifier, or the first TA list includes the second cell identifier. The transceiver module 1701 is further configured to send the first TA list to the terminal device, where the first TA list is used to identify a location area in which the terminal device registers.

Optionally, the transceiver module 1701 is further configured to send, to a network repository function network element, an identifier of the first network element, a cell identifier of a serving cell of the first network element, and a network identifier of a network in which the first network element is located, to register with the network repository function network element.

In another possible implementation, the processing module 1702 is configured to obtain a first cell identifier and a network identifier, where the network identifier includes an identifier of a first private network, and the first network element serves a terminal device in the first private network. The processing module 1702 is further configured to determine, based on the first cell identifier, that an area in which the terminal device is currently located is beyond a service range of a cell identified by the first cell identifier. The transceiver module 1701 is configured to send the first cell identifier and the network identifier to a first mobility management network element, where the first cell identifier and the network identifier are used to obtain downlink routing information, and the downlink routing information is used to indicate transmission of downlink data from a first user plane entity in the first private network to a second user plane entity in a public network.

All related content of the steps in the foregoing method embodiments may be cited in function descriptions of corresponding function modules. Details are not described herein again.

In this embodiment, the first network element 170 is presented with the function modules divided through integration. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the first network element 170 may be in a form of the communication device 700 shown in FIG. 7.

For example, the processor 701 in the communication device 700 shown in FIG. 7 may invoke the computer-executable instructions stored in the memory 703, so that the communication device 700 performs the communication method in the foregoing method embodiments.

Specifically, functions/implementation processes of the transceiver module 1701 and the processing module 1702 in FIG. 17 may be implemented by the processor 701 in the communication device 700 shown in FIG. 7 by invoking the computer-executable instructions stored in the memory 703. Alternatively, a function/an implementation process of the processing module 1702 in FIG. 17 may be implemented by the processor 701 in the communication device 700 shown in FIG. 7 by invoking the computer-executable instructions stored in the memory 703, and a function/an implementation process of the transceiver module 1701 in FIG. 17 may be implemented by using the communication interface 704 in the communication device 700 shown in FIG. 7.

The first network element 170 provided in this embodiment can perform the foregoing communication method. Therefore, for a technical effect that can be achieved by the first network element 170, refer to the foregoing method embodiment. Details are not described herein again.

It should be noted that one or more of the foregoing modules or units may be implemented by using software, hardware, or a combination thereof. When any one of the foregoing modules or units is implemented by software, the software exists in a form of computer program instructions that are stored in a memory. The processor may be configured to execute the program instructions to implement the foregoing method procedures. The processor may be built in an SoC (system-on-a-chip) or an ASIC, or may be an independent semiconductor chip. In addition to a core configured to perform an operation or processing by executing the software instructions, the processor may further include a necessary hardware accelerator, for example, a field programmable gate array (FPGA), a PLD (programmable logic device), or a logic circuit that implements a dedicated logical operation.

When the foregoing modules or units are implemented by using hardware, the hardware may be any one of or any combination of a CPU, a microprocessor, a digital signal processing (DSP) chip, a micro control unit (MCU), an artificial intelligence processor, an ASIC, an SoC, an FPGA, a PLD, a dedicated digital circuit, a hardware accelerator, or a non-integrated discrete component, and the hardware may run necessary software or does not depend on software, to perform the foregoing method procedures.

Optionally, an embodiment of this application further provides a communication device (for example, the communication device may be a chip or a chip system). The communication device includes a processor, configured to implement the method in any one of the foregoing method embodiments. In a possible design, the communication device further includes a memory. The memory is configured to store necessary program instructions and necessary data. The processor may invoke program code stored in the memory, to indicate the communication device to perform the method in any one of the foregoing method embodiments. Certainly, the communication device may not include a memory. When the communication device is a chip system, the communication device may include a chip, or may include a chip and another discrete component. This is not specifically limited in this embodiment of this application.

All or some of the foregoing embodiments may be implemented through software, hardware, firmware, or any combination thereof. When a software program is used to implement some embodiments, all or some of the embodiments may be implemented in a form of a computer program product. The computer program product includes one or more computer instructions. When the computer program instructions are loaded and executed on the computer, all or some of the procedure or functions according to some embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to some embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and some embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clear that, a person skilled in the art can make various modifications and variations to this application without departing from the spirit and scope of this application. This application is intended to cover the modifications and variations of this application provided that they fall within the scope of the following claims and equivalent technologies of this application.

What is claimed is:

1. A communication method, wherein the method comprises:

receiving, by a first mobility management network element, a first cell identifier and a network identifier from a first network element, wherein the network identifier comprises an identifier of a first private network and an identifier of a second private network;

obtaining, by the first mobility management network element, information about a second network element based on the first cell identifier and the network identifier, wherein the first network element serves a terminal device in the first private network, and wherein the second network element serves the terminal device in the second private network; and sending, by the first mobility management network element, the first cell identifier and the network identifier to the second network element indicated by the information about the second network element, wherein the first cell identifier and the network identifier are used to obtain downlink routing information, and wherein the downlink routing information is used to indicate transmission of downlink data from a first user plane entity in the first private network to a second user plane entity in the second private network.

2. The method according to claim 1, wherein the obtaining, by the first mobility management network element, information about a second network element based on the first cell identifier and the network identifier comprises:

determining, by the first mobility management network element, that the first cell identifier belongs to a first tracking area (TA) list allocated by the first mobility management network element to the terminal device;

sending, by the first mobility management network element, the first cell identifier and the network identifier to a network repository function network element, wherein the first cell identifier and the network identifier are used to determine the information about the second network element; and receiving, by the first mobility management network element, the information about the second network element from the network repository function network element.

3. The method according to claim 2, wherein the method further comprises:

receiving, by the first mobility management network element, a second cell identifier from the terminal device;

allocating, by the first mobility management network element, the first TA list to the terminal device, wherein the first TA list comprises the second cell identifier and the first cell identifier; and sending, by the first mobility management network element, the first TA list to the terminal device by using the first network element, wherein the first TA list is used to identify a location area in which the terminal device registers.

4. The method according to claim 1, wherein the obtaining, by the first mobility management network element, information about a second network element based on the first cell identifier and the network identifier comprises:

determining, by the first mobility management network element, that the first cell identifier does not belong to a first TA list allocated by the first mobility management network element to the terminal device;

sending, by the first mobility management network element, the first cell identifier to a network repository function network element;

receiving, by the first mobility management network element, information about a second mobility management network element from the network repository function network element, wherein the second mobility management network element is a mobility management network element that can serve a cell corresponding to the first cell identifier;

sending, by the first mobility management network element, the first cell identifier and the network identifier to the second mobility management network element indicated by the second mobility management network element, wherein the first cell identifier and the network identifier are used to determine the information about the second network element; and receiving, by the first mobility management network element, the information about the second network element from the second mobility management network element.

5. The method according to claim 4, wherein the method further comprises:

receiving, by the first mobility management network element, a second cell identifier from the terminal device;

allocating, by the first mobility management network element, the first TA list to the terminal device, wherein the first TA list comprises the second cell identifier; and sending, by the first mobility management network element, the first TA list to the terminal device by using the first network element, wherein the first TA list is used to identify a location area in which the terminal device registers.

6. The method according to claim 1, wherein the method further comprises:

receiving, by the first mobility management network element, the downlink routing information from the second network element, wherein the downlink routing information is allocated by the second user plane entity; and sending, by the first mobility management network element, the downlink routing information to the first user plane entity by using the first network element.

7. The method according to claim 1, wherein the method further comprises:

receiving, by the first mobility management network element, a second cell identifier from the terminal device;

receiving, by the first mobility management network element, the network identifier from a unified data management network element;

determining, by the first mobility management network element based on the second cell identifier and the network identifier, that a private network that can be accessed by the terminal device is deployed in a cell identified by the second cell identifier; and sending, by the first mobility management network element, registration rejection information to the terminal device, wherein the registration rejection information is used to indicate the terminal device to register with the private network that can be accessed by the terminal device.

8. A communication method, wherein the method comprises:

obtaining, by a first network element, a first cell identifier and a network identifier, wherein the network identifier comprises an identifier of a first private network and an identifier of a second private network, and wherein the first network element serves a terminal device in the first private network;

determining, by the first network element based on the first cell identifier, that an area in which the terminal device is currently located is beyond a service range of a cell identified by the first cell identifier; and sending, by the first network element, the first cell identifier and the network identifier to a first mobility management network element, wherein the first cell identifier and the network identifier are used to obtain downlink routing information, and wherein the downlink routing information is used to indicate transmission of downlink data from a first user plane entity in the first private network to a second user plane entity in the second private network.

9. The method according to claim 8, wherein the method further comprises:
receiving, by the first network element, the downlink routing information from the first mobility management network element, wherein the downlink routing information is allocated by the second user plane entity; and
sending, by the first network element, the downlink routing information to the first user plane entity.

10. The method according to claim 8, wherein the method further comprises:
receiving, by the first network element, a second cell identifier from the terminal device;
sending, by the first network element, the second cell identifier to the first mobility management network element;
receiving, by the first network element from the first mobility management network element, a first tracking area (TA) list allocated by the first mobility management network element to the terminal device, wherein:
the first TA list comprises the second cell identifier and the first cell identifier; or
the first TA list comprises the second cell identifier; and
sending, by the first network element, the first TA list to the terminal device, wherein the first TA list is used to identify a location area in which the terminal device registers.

11. The method according to claim 8, wherein the method further comprises:
sending, by the first network element to a network repository function network element, an identifier of the first network element, a cell identifier of a serving cell of the first network element, and a particular network identifier of a network in which the first network element is located, to register with the network repository function network element.

12. A communication device, comprising:
a transceiver;
at least one processor; and
one or more memories coupled to the at least one processor and storing programming instructions for execution by the at least one processor to:
receive, by the transceiver, a first cell identifier and a network identifier from a first network element, wherein the network identifier comprises an identifier of a first private network and an identifier of a second private network;
obtain information about a second network element based on the first cell identifier and the network identifier, wherein the first network element serves a terminal device in the first private network, and wherein the second network element serves the terminal device in the second private network; and
send, by the transceiver, the first cell identifier and the network identifier to the second network element indicated by the information about the second network element, wherein the first cell identifier and the network identifier are used to obtain downlink routing information, and wherein the downlink routing information is used to indicate transmission of downlink data from a first user plane entity in the first private network to a second user plane entity in the second private network.

13. The communication device according to claim 12, wherein the obtaining information about a second network element based on the first cell identifier and the network identifier comprises:
determining that the first cell identifier belongs to a first tracking area (TA) list allocated by the communication device to the terminal device;
sending, by the transceiver, the first cell identifier and the network identifier to a network repository function network element, wherein the first cell identifier and the network identifier are used to determine the information about the second network element; and
receiving, by the transceiver, the information about the second network element from the network repository function network element.

14. The communication device according to claim 13, wherein the programming instructions are for execution by the at least one processor to:
receive a second cell identifier from the terminal device;
allocate the first TA list to the terminal device, wherein the first TA list comprises the second cell identifier and the first cell identifier; and
send the first TA list to the terminal device by using the first network element, wherein the first TA list is used to identify a location area in which the terminal device registers.

15. The communication device according to claim 12, wherein the obtaining information about a second network element based on the first cell identifier and the network identifier comprises:
determining that the first cell identifier does not belong to a first TA list allocated by the communication device to the terminal device;
sending, by the transceiver, the first cell identifier to a network repository function network element;
receiving, by the transceiver, information about a second mobility management network element from the network repository function network element, wherein the second mobility management network element is a mobility management network element that can serve a cell corresponding to the first cell identifier;
sending, by the transceiver, the first cell identifier and the network identifier to the second mobility management network element indicated by the second mobility management network element, wherein the first cell identifier and the network identifier are used to determine the information about the second network element; and
receiving, by the transceiver, the information about the second network element from the second mobility management network element.

16. The communication device according to claim 15, wherein the programming instructions are for execution by the at least one processor to:
receive a second cell identifier from the terminal device;
allocate the first TA list to the terminal device, wherein the first TA list comprises the second cell identifier; and
send, by the transceiver, the first TA list to the terminal device by using the first network element, wherein the first TA list is used to identify a location area in which the terminal device registers.

17. The communication device according to claim 12, wherein the programming instructions are for execution by the at least one processor to:
- receive, by the transceiver, the downlink routing information from the second network element, wherein the downlink routing information is allocated by the second user plane entity; and
- send, by the transceiver, the downlink routing information to the first user plane entity by using the first network element.

18. The communication device according to claim 12, wherein the programming instructions are for execution by the at least one processor to:
- receive, by the transceiver, a second cell identifier from the terminal device;
- receive, by the transceiver, the network identifier from a unified data management network element;
- determine, based on the second cell identifier and the network identifier, that a private network that can be accessed by the terminal device is deployed in a cell identified by the second cell identifier; and
- send, by the transceiver, registration rejection information to the terminal device, wherein the registration rejection information is used to indicate the terminal device to register with the private network that can be accessed by the terminal device.

* * * * *